US007971156B2

(12) United States Patent
Albertson et al.

(10) Patent No.: US 7,971,156 B2
(45) Date of Patent: Jun. 28, 2011

(54) CONTROLLING RESOURCE ACCESS BASED ON USER GESTURING IN A 3D CAPTURED IMAGE STREAM OF THE USER

(75) Inventors: Jacob C. Albertson, Newton, MA (US); Kenneth C. Arnold, Ellicott City, MD (US); Steven D. Goldman, Chesterfield, MO (US); Michael A. Paolini, Austin, TX (US); Anthony J. Sessa, Quogue, NY (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 11/622,687

(22) Filed: Jan. 12, 2007

(65) Prior Publication Data

US 2008/0170776 A1    Jul. 17, 2008

(51) Int. Cl.
*G06F 3/00* (2006.01)
(52) U.S. Cl. ........................................ 715/863
(58) Field of Classification Search ........................ None
See application file for complete search history.

(56) References Cited

U.S. PATENT DOCUMENTS

| 5,103,305 | A | | 4/1992 | Watanabe |
| 5,109,425 | A | | 4/1992 | Lawton |
| 5,454,043 | A | | 9/1995 | Freeman |
| 5,502,803 | A | | 3/1996 | Yoshida et al. |
| 5,581,276 | A | | 12/1996 | Cipolla et al. |
| 5,691,693 | A | | 11/1997 | Kithil |
| 5,714,698 | A | | 2/1998 | Tokioka et al. |
| 5,777,720 | A | * | 7/1998 | Shapiro et al. ................. 351/237 |
| 5,880,731 | A | | 3/1999 | Liles et al. |
| 5,930,378 | A | | 7/1999 | Kubota et al. |
| 6,002,808 | A | | 12/1999 | Freeman |
| 6,049,747 | A | | 4/2000 | Nakajima et al. |
| 6,072,494 | A | | 6/2000 | Nguyen |
| 6,115,053 | A | | 9/2000 | Perlin |
| 6,154,558 | A | | 11/2000 | Hsieh |

(Continued)

FOREIGN PATENT DOCUMENTS

CN         1655197 A         8/2005

(Continued)

OTHER PUBLICATIONS

USPTO Notice of Allowance, Dated Apr. 23, 2010, in Re Albertson (U.S. Appl. No. 11/622,693, filed Jan. 12, 2007), pp. 1-14.

(Continued)

*Primary Examiner* — Ryan F Pitaro
(74) *Attorney, Agent, or Firm* — David A. Mims, Jr.; Amy J. Pattillo

(57) ABSTRACT

A computer-implemented method, system, and program product comprises a gesture processing system for capturing a three-dimensional movement of a user, wherein the three-dimensional movement is determined using at least one stereoscopic image device aimed at the user to identify and track at least one particular three-dimensional movement of the user. The gesture processing system predicts at least one defined movement within the captured three-dimensional movement matching at least one gesture definition of at least one gesture type from among a plurality of gesture definitions. A resource control system receives a request to access a resource based on the predicted at least one gesture type. The resource control system only allows user access to the resource by matching the predicted at least one gesture type with at least one required gesture type.

20 Claims, 9 Drawing Sheets

U.S. PATENT DOCUMENTS

| | | | |
|---|---|---|---|
| 6,181,343 | B1 | 1/2001 | Lyons |
| 6,215,890 | B1 | 4/2001 | Matsuo et al. |
| 6,295,367 | B1 | 9/2001 | Crabtree et al. |
| 6,301,370 | B1 | 10/2001 | Steffens et al. |
| 6,421,453 | B1 | 7/2002 | Kanevsky |
| 6,577,937 | B1 | 6/2003 | Shuman |
| 6,674,877 | B1 | 1/2004 | Jojic et al. |
| 6,766,036 | B1 | 7/2004 | Pryor |
| 6,784,901 | B1 | 8/2004 | Harvey et al. |
| 6,788,809 | B1 | 9/2004 | Grzeszczuk et al. |
| 6,859,144 | B2 | 2/2005 | Newman et al. |
| 7,039,676 | B1 | 5/2006 | Day et al. |
| 7,058,204 | B2 | 6/2006 | MacDougall et al. |
| 7,068,843 | B2 | 6/2006 | Chang et al. |
| 7,224,830 | B2 | 5/2007 | Nefian et al. |
| 7,274,800 | B2 | 9/2007 | Nefian et al. |
| 2002/0004629 | A1 | 1/2002 | Natori |
| 2002/0118880 | A1 | 8/2002 | Liu |
| 2002/0152010 | A1 | 10/2002 | Colmenarez |
| 2003/0058111 | A1 | 3/2003 | Lee et al. |
| 2003/0076300 | A1 | 4/2003 | Lauper |
| 2003/0113108 | A1 | 6/2003 | Nefian |
| 2003/0142068 | A1 | 7/2003 | DeLuca |
| 2003/0156756 | A1 | 8/2003 | Gortuk |
| 2003/0227453 | A1 | 12/2003 | Beier et al. |
| 2004/0032970 | A1 | 2/2004 | Kiraly |
| 2004/0161132 | A1 | 8/2004 | Cohen et al. |
| 2004/0228503 | A1 | 11/2004 | Cutler |
| 2005/0030184 | A1 | 2/2005 | Victor |
| 2005/0069852 | A1 | 3/2005 | Janakiraman et al. |
| 2005/0166163 | A1 | 7/2005 | Chang |
| 2005/0206610 | A1 | 9/2005 | Cordeli |
| 2005/0210419 | A1 | 9/2005 | Kela et al. |
| 2006/0013440 | A1 | 1/2006 | Cohen |
| 2006/0067573 | A1* | 3/2006 | Parr et al. .................. 382/154 |
| 2006/0097857 | A1 | 5/2006 | Osaka et al. |
| 2006/0098737 | A1* | 5/2006 | Sethuraman et al. .... 375/240.16 |
| 2006/0181518 | A1 | 8/2006 | Shen et al. |
| 2006/0181519 | A1 | 8/2006 | Vernier et al. |
| 2006/0210112 | A1 | 9/2006 | Cohen et al. |
| 2007/0041058 | A1* | 2/2007 | Disatnik et al. .............. 358/486 |
| 2007/0063855 | A1 | 3/2007 | Maass |
| 2008/0022365 | A1* | 1/2008 | Chae et al. .................. 726/2 |
| 2008/0040692 | A1 | 2/2008 | Sunday et al. |
| 2008/0068187 | A1 | 3/2008 | Bonefas et al. |
| 2008/0143895 | A1* | 6/2008 | Peterka et al. .................. 349/15 |
| 2009/0274339 | A9* | 11/2009 | Cohen et al. .................. 382/103 |
| 2010/0169792 | A1* | 7/2010 | Ascar et al. .................. 715/744 |

FOREIGN PATENT DOCUMENTS

| | | | |
|---|---|---|---|
| EP | 0905644 | A | 3/1999 |
| EP | 0991011 | A | 4/2000 |
| EP | 1723901 | A | 11/2006 |
| EP | 1723901 | A1 | 11/2006 |
| FR | 2784887 | A | 4/2000 |
| WO | 0002187 | A | 1/2000 |
| WO | 2004108466 | A | 12/2004 |

OTHER PUBLICATIONS

USPTO Notice of Allowance Dated May 3, 2010, in Re Albertson (U.S. Appl. No. 11/622,684, filed Jan. 12, 2007), pp. 1-37.

Alan Yuille, "Computer Vision Systems for the Blind and Visually Disabled", UCLA Dept. Statistics and Psychology, 4 pages, [online], [print accessed on Aug. 18, 2006]. Retrieved from the internet < www.stat.ucla.edu/~yuille/courses/FIAT_Stat19/fiat3.ppt>.

"What is Photosynth", Microsoft Live Labs, copyright Microsoft Corporation 2006, 1 page, [online], [print accessed on Aug. 18, 2006]. Retrieved from the internet <http://labs.live.com/photosynth/whatis/>.

"What is Synthetic Aperture Radar", 3 pages, copyright 2005, Sandia Corporation, [online], [print accessed on Aug. 18, 2006]. Retrieved from the Internet <http://www.sandia.gov/RADAR/whatis.html>.

"Accelerometer", 3 pages, copyright Wikipedia, [online], [print accessed on Oct. 31, 2006], [last modified on Oct. 24, 2006]. Retrieved from the internet <http://en.wikipedia.org/wiki/Accelerometer>.

Eric Lipton, "Faces, Too are Searched as U.S. Airports Try to Spot Terrorists", 1 page, The New York Times, Aug. 17, 2006.

USPTO Notice of Allowance, Dated Dec. 14, 2009, in RE Albertson (U.S. Appl. No. 11/470,421, filed Sep. 6, 2006) pp. 1-13.

USPTO Office Action, Dated Jan. 15, 2010, in RE Albertson (U.S. Appl. No. 11/622,684, filed Jan. 12, 2007), pp. 1-24.

USPTO Office Action, Dated Jan. 14, 2010, in RE Albertson (U.S. Appl. No. 11/622,693, filed Jan. 12, 2007), pp. 1-23.

USPTO Office Action, Dated Mar. 22, 2010, in RE Albertson (U.S. Appl. No. 11/622,690, Filed Jan. 12, 2007, 30 Pages.

USPTO Office Action, dated Mar. 30, 2010, In RE Alberston (U.S. Appl. No. 11/622,685, Filed Jan. 12, 2007, 28 Pages.

"Method for Access Control Via Gesural Verification", IBM Technical Disclosure Bulletin, IBM Corp, New York, US, vol. 36, No. 9B, Sep. 1, 1993, pp. 487-488, 2 pages.

Black, MJ et al, "Recognizing Temporal Trajectories Using the Condensation Algorithm", Automatic Face and Gesture Recognition, 1998, Proceedings from the Third IEEE International Conference on Nara, Japan, Apr. 1998, Los Alamitos CA, USA, IEEE Comuting Society, pp. 16-21, 6 pages.

Jacob C Albertson et al, "Warning a User About Adverse Behaviors of Others Within an Environment Based on a 3D Captured Image Stream", U.S. Appl. No. 11/622,676, filed Jan. 12, 2007.

Jacob C Albertson et al, "Adjusting a Consumer Experience Based on a 3D Captured Image Stream of a Consumer Response", U.S. Appl. No. 11/622,679, filed Jan. 12, 2007.

Jacob C Albertson et al, "Warning a Vehicle Operator of Unsafe Operation Behavior Based on a 3D Captured Image Stream", U.S. Appl. No. 11/622,684, filed Jan. 12, 2007.

Jacob C Albertson et al, "Tracking a Range of Body Movement Based on 3D Captured Image Streams of a User", U.S. Appl. No. 11/622,685, filed Jan. 12, 2007.

Jacob C Albertson et al, "Controlling a Document Based on User Behavioral Signals Detected from a 3D Captured Image Stream", U.S. Appl. No. 11/622,690, filed Jan. 12, 2007.

Jacob C Alberston et al. "Controllings a System Based on User Behavioral Signals Detected from a 3D Captured Image Stream", U.S. Appl. No. 11/622,693, filed Jan. 12, 2007.

Jacob C Albertson et al, "Assisting a Vision-Impaired User with Navigation Based on a 3D Captured Image Stream", U.S. Appl. No. 11/622,696, filed Jan. 12, 2007.

Jacob C Albertson et al, "Informing a User Gestures Made by Others Out of the User's Line of Sight", U.S. Appl. No. 11/470,421, filed Sep. 6, 2006.

USPTO Office Action, Dated Jun. 25, 2009, in RE Albertson (U.S. Appl. No. 11/470,421, filed Sep. 6, 2006), pp. 1-20.

Albertson et al, Notice of Allowance, U.S. Appl. No. 11/622,685, filed Jan. 12, 2007, 13 pages.

Albertson et al, USPTO Notice of Allowance, U.S. Appl. No. 11/622,690, filed Jan. 12, 2007, mailing date Sep. 20, 2010, 27 pages.

Doherty, G.J., "Formal Verification in the Design of Gestural Interaction", Electronic Notes in Theoretical Computer Science, vol. 43, pp. 75-96 (2001).

* cited by examiner

CONTROLLING RESOURCE ACCESS BASED ON USER GESTURING IN A 3D CAPTURED IMAGE STREAM OF THE USER

TECHNICAL FIELD

The present invention relates in general to providing resource security. In particular, the present invention relates to controlling, from a predicted user gesture based on a three-dimensional image stream captured by one or more image capture devices, user access to a resource based on whether the predicted user gesture matches a required gesture.

DESCRIPTION OF THE RELATED ART

Many resources today are restricted to access or use by only a selection of authorized users. Thus, to access many resources today, such as to unlock an electronically controlled lock, to arm or disarm a security system, to access a bank account at an automated teller machine or on-line, or to confirm a credit card access, a user is often required to enter a password on a keyboard or speak a password. If the keypad entries or spoken words match a required key or audio password, then the user is provided access to a requested resource.

Some systems provide additional levels of user authentication for access to a resource by detecting a unique fingerprint, voice imprint, or retinal scan of the user requesting access to a resource and comparing the detected fingerprint, voice imprint, or retinal scan with a previously stored fingerprint, voice signature, or retinal scan signature for the user. By requiring restricting access based on whether a user's physical characteristic matches a required physical characteristic, additional security is added.

While detecting a user's physical characteristic provides one method of user authentication, a user may not want to provide a record of a physical characteristic or a physical characteristic alone may not provide sufficient identification. Therefore, in view of the foregoing, there is a need for a method, system, and program product for capturing a three-dimensional image stream of a user gesturing, predicting at least one gesture type of a user gesture from the captured three-dimensional image stream, and controlling a resource based on whether the predicted gesture type of the user gesture matches with a required gesture definition.

SUMMARY OF THE INVENTION

Therefore, the present invention provides improved resource security. In particular, the present invention provides for controlling, from a predicted user gesture based on a three-dimensional image stream captured by one or more image capture devices, user access to a resource based on whether the predicted user gesture matches a required gesture.

In one embodiment, a computer-implemented method, system, and program product comprises a gesture processing system for capturing a three-dimensional movement of a user, wherein the three-dimensional movement is determined using at least one stereoscopic image device aimed at the user to identify and track at least one particular three-dimensional movement of the user. The gesture processing system predicts at least one gesture definition of at least one gesture type from among multiple gesture definitions matching at least one defined movement within the captured three-dimensional movement. A resource control system receives a request to access a resource based on the predicted at least one gesture type. The resource control system only allows user access to the resource by matching the predicted at least one gesture type with at least one required gesture type.

In one example, predicting at least one gesture definition of at least one gesture type includes calculating a percentage probability that the at least one defined movement represents the at least one gesture type defined in the at least one gesture definition. In another example, predicting at least one gesture definition of at least one gesture type includes calculating a percentage probability that the at least one defined movement maps to the at least one gesture type defined in the at least one gesture definition, wherein the at least one gesture definition specifies a particular gesture definition of the at least one gesture type by the user. In addition, in another example, predicting at least one gesture definition of at least one gesture type further includes identifying at least one of body movement of the user comprising at least one of a head movement, a facial expression, an eye movement, a muscle contraction, and a change in skin surface characteristics of the user from the defined movement matching at least one of the plurality of gesture definitions.

In another embodiment, the gesture processing system captures three-dimensional movement of a user and predicts a sequence of a plurality of defined movements within the captured three-dimensional movement matching at least one gesture definition of at least one gesture type from among a plurality of gesture definitions. A separate time range is assigned to each of the separate defined movements matching at least one gesture type. The resource control system only allows the user access to the resource by matching the predicted gesture types at the separate time ranges with a required series of least one required gesture type repeated to match a time-based pattern.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
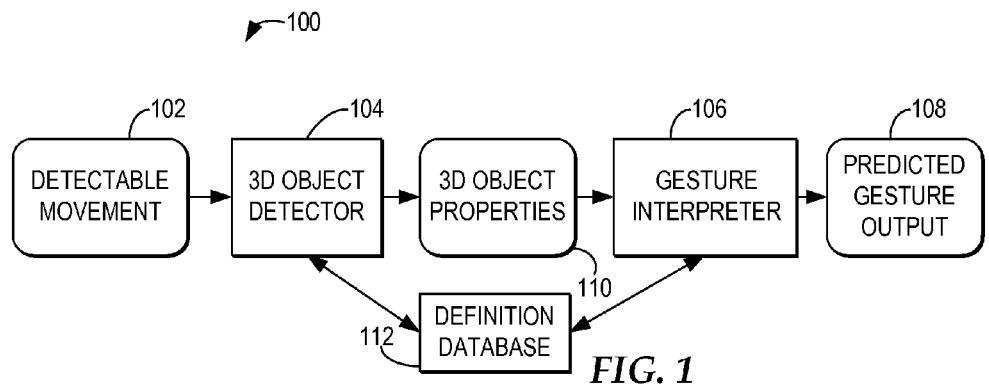
FIG. 1 is a block diagram illustrating a flow of information in a gesture processing method, system, and program product.

With reference now to FIG. 1, a block diagram illustrates a flow of information in a gesture processing method, system, and program product. It will be understood that FIG. 1 provides one embodiment of information flow for capturing image streams of user movement and processing those image streams to predict user gestures, however, other information flows may be implemented to process captured data and predict user gestures from the captured data.

It is important to note that as used throughout, the term "gesture" may include user bodily movements typically labeled as gesturing, behavior or body language. In the embodiment, a gesture may include, but is not limited to, a facial expression, any detectable body movements, detectable body posture, detectable eye movements, changes in skin surface characteristics such as color, temperature, tone, and level of perspiration, changes in muscle contraction, and other types of non-verbal communication.

In the example, a gesture processing system 100 includes a three-dimensional (3D) object detector 104. 3D object detector 104 represents multiple systems for capturing images and other data about moving and stationary objects, streamlining the captured data, tracking particular objects within the captured movement, streaming the properties of the particular objects, and combining the streamed properties into a three-dimensional representation of the 3D characteristics of the captured objects, as illustrated by 3D object properties 110. 3D object properties 110 may include, but are not limited to, positions, color, size, and orientation, representative of user movement, other objects within an environment, and the background identifying attributes of an environment, for example.

In the example, 3D object detector 104 captures images within a focus area, represented as detectable movement 102. In addition, 3D object detector 104 may detect other types of data within a focus area. In particular, 3D object detector 104 detects detectable movement 102 through multiple types of image and data detection including, but not limited to, capturing video images, detecting body part movement, detecting skin texture, detecting eye movement, detecting skin surface characteristics, and capturing thermal images. For supporting multiple types of image and data detection, 3D object detector 104 may include multiple types of image capture devices, including one or more video cameras arranged for stereoscope image capture, and other types of sensors for capturing at least one other characteristic of one or more objects, such as thermal body imaging sensors, skin texture sensors, laser sensing devices, sound navigation and ranging (SONAR) devices, or synthetic laser or sonar systems. In particular, a sensor may be implemented using a separate sensor unit or may be implemented through a logic unit that operates on a captured image stream. For example, a logic unit may process the captured image stream to detect facial skin textures distinguishable from non-skin textures, such as a smooth wall or textured foliage, within a focus area.

Portions of detectable movement 102 may include images and other data representative of actual user gestures and other portions of detectable behavior movement 102 may include images and data not representative of user gestures. 3D object detector 104 translates detectable movement 102 into a stream of 3D properties of detected objects and passes the stream of 3D object properties 110 to gesture interpreter 106.

In one embodiment, gesture interpreter 106 maps the streamed 3D object properties 110 into one or more gesture definitions, predicts a type of gesture from the gesture definitions, and calculates a probability that the type of gesture in detectable movement 102 matches the gesture definition. In addition, in another embodiment, gesture interpreter 106 maps the streamed 3D object properties 110 into one or more gesture definitions specific for a particular user and calculates a probability that the identified type of gesture matches the gesture definition for the particular user.

Gesture interpreter 106 outputs each predicted gesture type and percentage probability as predicted gesture output 108. Gesture interpreter 106 may pass predicted gesture output 108 to one or more gesture-enabled applications at one or more systems. In particular, according to an advantage of the present invention, gesture interpreter 106 passes predicted gesture output 108 to a gesture-enabled resource control system that determines, based on predicted gesture output 108, whether to allow access to a resource, confirm a resource, or process a request to identify a resource. As used throughout, the term "resource" may include, but is not limited to, a secured area, a financial account, an identification device, such as a passport or a credit card. In addition, a "resource" may include a service, such as telephone service or other service only provided to authorized users.

In particular, in processing detectable movement 102 and generating predicted gesture output 108, 3D object detector 104 and gesture interpreter 106 may access a definition database 112 of previously accumulated and stored gesture definitions to better track and detect, within 3D object properties 110, those monitored objects representative of gestures, to better recognize a gestures by a particular user within detectable movement 102, and to better recognize the types of gestures representative of gestures made to authenticate the identity of a user Further, in processing detectable movement 102 and generating predicted gesture output 108, 3D object detector 104 and gesture interpreter 106 attempt to identify objects representative of user gestures and predict the type of gesture in view of the overall interaction in which the gesture is made. Thus, 3D object detector 104 and gesture interpreter 106 attempt to determine not just that a moving object is a gesture, but a level of emphasis included in a gesture that would effect the type of gesture, a background of a gesturing user that would effect the type of gesture, the environment in which the user gestures which would effect the type of gesture, combinations of movement made together that effect the meaning of the movement as a gesture or combination of gestures and other detectable factors that effect the determination of a type of gesture and meaning of a gesture. Thus, definition database 112 includes gesture definitions corresponding different types of people, environments, and other factors that may affect the mapping of a gesture to determine a type and meaning of a gesture. In addition, definition database 112 may be trained to more accurately identify particular users based on user gesturing.

In addition, in processing detectable movement 102, multiple separate systems of image capture devices and other sensors may each capture image and data about separate or overlapping focus areas from different angles. The separate systems of image capture devices and other sensors may be communicatively connected via a wireless or wired connection and may share captured images and data with one another, between 3D object detectors or between gesture interpreters, such that with the combination of data, gesture interpreter 106 may interpreter gestures with greater accuracy.

Figure 2:
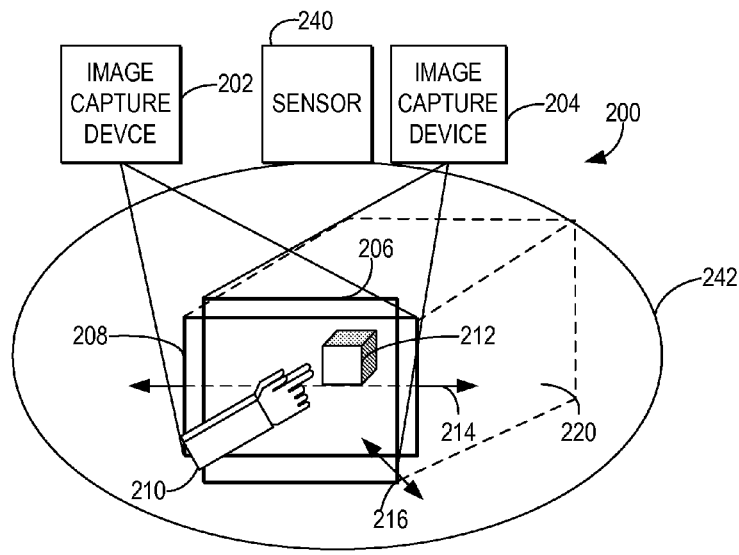
FIG. 2 is an illustrative block diagram depicting an example an environment in which a 3D object detector captures and generates the 3D object properties representative of captured movement.

Referring now to FIG. 2, an illustrative diagram depicts an example of an environment in which a 3D object detector captures and generates the 3D object properties representative of captured movement. It will be understood that detectable movement environment 200 is one example of an environment in which 3D object detector 104 detects images and data representative of detectable movement 102, as described with reference to gesture processing system 100 in FIG. 1.

In the example, detectable movement environment 200 includes a stereoscopic image device comprising an image capture device 202 and an image capture device 204, each positioned to detect user movement and other items within a combined 3D focus area 220. In the depicted embodiment, image capture device 202 and image capture device 204 may each be positioned on one stationary axis or separate stationary axis, such that the area represented by 3D focus area 220 remains constantly focused upon. In addition, in the depicted embodiment, image capture device 202 and image capture device 204 and any other sensors may be positioned in parallel, at tangents, or at any other angles to control the span of and capture images within 3D focus area 220.

In another embodiment, image capture device 202 and image capture device 204 may each be positioned on a position adjustable axis or the actual focus point of image capture device 202 and image capture device 204 may be adjustable, such that the area represented by 3D focus area 220 may be repositioned. In one example, each of image capture device 202 and image capture device 204 may be coupled with one or more thermal imaging devices that detect thermal imaging based movement within a broad area and directs the repositioning of the focus area of each of image capture device 202 and image capture device 204 to track the thermal movement within the focus area of each camera.

In yet another embodiment, image capture device 202 and image capture device 204 may be affixed to an apparatus that is carried by or worn by a person. For example, image capture device 202 and image capture device 204 may be affixed to a pair of glasses or other headwear worn by a person, such that 3D focus area 220 changes as the person wearing the glasses moves.

Although not depicted, in another embodiment, only a single video camera, such as image capture device 202, may be implemented as a stereoscopic image device. The single video camera is placed on a track or other adjustable axis and a controller adjusts the position of the single video camera along the track, wherein the single video camera then captures a stream of video images within a focus area at different positioned points along the track and 3D behavior detector 104 combines the stream of images into a 3D object property stream of the properties of detectable objects. In one example, the 3D object property stream can be generated from comparing the changes in luminance and shadowing across the frames as the camera changes in position. Alternatively, a stereoscopic image device may be implemented using a single fixed camera coupled with a sensor that detects depth. In addition, alternatively, a single camera enabled to process images and detect depth from a fixed position may function as a stereoscopic image device. For example, the single camera may process images and detect depth from detecting the movement of a light source and comparing changes in luminance and shadowing across the captured image frames. In particular, the single camera system may first map a model of a monitored face, focusing on the eyes, mouth, and nose and then detect changes in luminance and shadowing across image frames to detect depth characteristics of the face. In other examples, a system may process a captured stream of video images to extract depth from other characteristics of the stream of images.

For purposes of example, 3D focus area 220 includes a first capture plane 206, captured by image capture device 202 and a second capture plane 208, captured by image capture device 204. First capture plane 206 detects movement within the plane illustrated by reference numeral 214 and second capture plane 208 detects movement within the plane illustrated by reference numeral 216. Thus, for example, image capture device 202 detects movement of an object side to side or up and down and image capture device 204 detects movement of an object forward and backward within 3D focus area 220. It is important to note that when the movement of an object is tracked at a fine granularity, even small adjustments in body movement such as a raised eyebrow, an eye movement, and a change in lip position of a user are tracked and can then be interpreted as one or more types of gestures.

In the example, within 3D focus area 220, a hand 210 represents a moving object and a box 212 represents a stationary object. In the example, hand 210 is the portion of a person's hand within 3D focus area 220. A monitored operator may make any number of movements representative of gestures by moving a position of or a portion of hand 210.

As a person moves hand 210 within 3D focus area 220, each of image capture device 202 and image capture device 204 capture a video stream of the movement of hand 210 within capture plane 206 and capture plane 208. From the video streams, 3D object detector 104 detects hand 210 as a moving object within 3D focus area 220 and generates a 3D property stream, representative of 3D object properties 110, of hand 210 over a period of time.

In addition, a person may move hand 210 in relation to box 212 or another object. For example, a user may point or make another type of gesture directed to box 212. As the person moves hand 210 within 3D focus area 220, the video streams captured by image capture device 202 and image capture device 204 include the movement of hand 210 and box 212. From the video streams, 3D object detector 104 detects hand 210 as a moving object and box 212 as a stationary object within 3D focus area 220 and generates 3D object property streams indicating the 3D properties of box 212 and the 3D properties of hand 210 in relation to box 212 over a period of time.

It is important to note that by capturing different planes of movement within 3D focus area 220 using multiple cameras, more points of movement are captured than would occur with a typical stationary single camera. By capturing more points of movement from more than one angle, 3D object detector 104 can more accurately detect and define a 3D representation of stationary objects and moving objects, including gestures, within 3D focus area 220. In addition, the more accurately that 3D object detector 104 defines a 3D representation of a moving object, the more accurately gesture interpreter 106 can predict a gesture from the 3D model. For example, a gesture could consist of a person making a motion directly towards or away from one of image capture device 202 and image capture device 204 which would not be able to be captured in a two dimensional frame; 3D object detector 104 detects and defines a 3D representation of the gesture as a moving object and gesture interpreter 106 predicts the gesture made by the movement towards or away from a video camera from the 3D model of the movement.

In addition, it is important to note that while FIG. 2 illustrates a gesturing hand 210 and a stationary box 212, in alternate embodiments, 3D focus area 220 may include multiple people, such that image capture device 202 and image capture device 204 capture images of the gestures of multiple people, and 3D object detector 104 detects each gesture by each gesture as a separate object. In particular, 3D object detector 104 may detect, from the captured video images from image capture device 202 and image capture device 204, gestures with more motion, such as gesture made with hands, and gesture made with less motion, such as facial expressions, to accurately generate 3D object properties of a person's gestures.

In the example, in addition to capturing images within focus area 220, within detectable movement environment 200, other sensors may detect information relevant to an environment, but outside of focus area 220. For example, sensor 240 may detect information within a sensor area 242. Sensor area 242 may overlap, be incorporated within, incorporate, or be separate from focus area 220. 3D object detector 104 combines the sensed information with captured images to more accurately generate 3D object properties 110 and to provide additional information about user gestures or an environment in which a user gestures in predicted gesture output 108.

In one example, sensor 240 may perform facial recognition or other identification recognition from the captured image streams. In one example, sensor 240 may access a database of facial mappings for users and identify a particular user facial mapping matching a particular facial mapping from the database. In another example, sensor 240 may analyze the captured image stream for text that may identify a user. For example, sensor 240 may detect a badge number the captured image stream of a badge worn by a user. By sensor 240 detecting a user identity, object detector 104 may more accurately generate 3D object properties and movement interpreter 106 may more accurately predict types of user movement from definitions specified for the identified user in definition database 112.

Additionally, in another example, sensor 240 may supplement user recognition by detecting information broadcast from RFID chips placed on items within sensor area 242, where the RFID of an item broadcasts the item type, the item location, and any warning conditions associated with the item. For example, a portable telephone carried by a user, an identification card carried by a user or other item carried by a user may include an RFID chip that broadcasts one or more of an identifier for the user and an identifier for the item. By combining sensed information about the location of a particular item or user with captured images from which the image is identified, object detector 104 may more accurately generate 3D object properties 110 and gesture interpreter 106 may more accurately predict the types of 3D objects, such as a portable telephone, and gesture associated with the portable telephone, within 3D object properties 110. In addition, by sensor 240 accessing identification information, behavior interpreter 106 may more accurately track 3D objects in association with a particular user when multiple users are monitored simultaneously.

In yet another example, sensor 240 may detect additional information about the depth, surface area, color temperature or other characteristic of an object to more accurately predict whether the object is representative of gesture movement. In particular, by detecting additional information about the depth, surface area, or other characteristic of an object, data collected by sensor 240 is combined with images captured by image capture device 202 and image capture device 204 to generate additional detail and granularity in a 3D image of an object representative of gesture movement.

Figure 3:
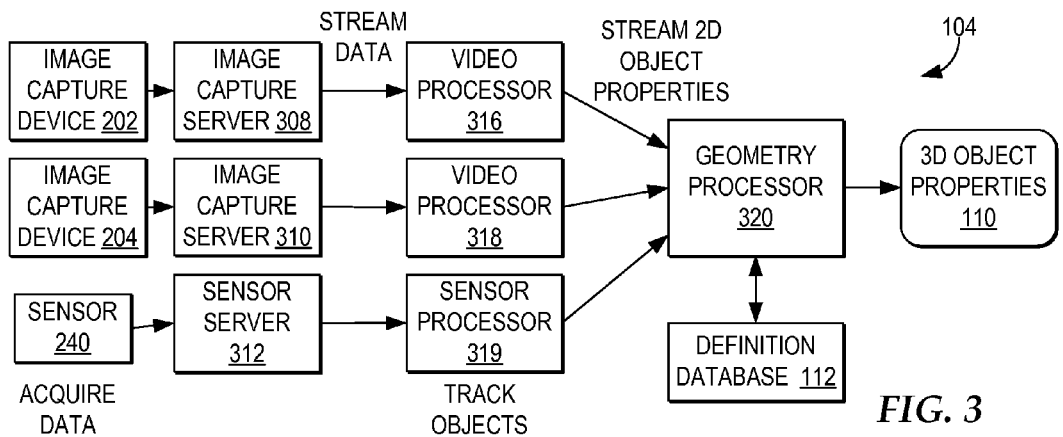
FIG. 3 is a block diagram illustrating one embodiment of a 3D object detector system for generating 3D object properties for enabling a gesture interpreter to interpret, from 3D object properties, types of user gestures.

With reference now to FIG. 3, a block diagram illustrates one embodiment of a 3D object detector system for generating 3D object properties for enabling a gesture interpreter to interpret, from 3D object properties, types of user gestures. It is important to note that the multiple components depicted within 3D object detector 104 may be incorporated within a single system or distributed via a network, other communication medium, or other transport medium across multiple systems. In addition, it is important to note that additional or alternate components from those illustrated may be implemented in 3D object detector 104 for capturing images and data and generating a stream of 3D object positions 110.

Initially, multiple image capture devices, such as image capture device 202, image capture device 204 and sensor 240, represent a stereoscopic image device for acquiring the data representative of detectable movement 102 within a 3D focus area and sensor area, such as 3D focus area 220 and sensor area 242. As previously described, image capture device 202 and image capture device 204 may represent video cameras for capturing video images. In addition, image capture device 202 and image capture device 204 may represent a camera or other still image capture device. In addition, image capture device 202 and image capture device 204 may represent other types of devices capable of capturing data representative of detectable behavior movement 102. Image capture device 202 and image capture device 204 may be implemented using the same type of image capture system or different types of image capture systems. In addition, the scope, size, and location of the capture area and plane captured by each of image capture device 202 and image capture device 204 may vary.

Sensor 240 detects information about objects in a particular sensor area that enhances the ability of 3D object detector 104 to create 3D object properties 110. As previously described, sensor 240 may represent one or more different types of sensors, including, but not limited to, RFID readers, thermal body imaging sensors, skin texture sensors, laser sensing devices, sound navigation and ranging (SONAR) devices, or synthetic laser or sonar systems. In addition, sensor 240 may include sensors that detect a particular type of body part, a particular type of body movement, or textures indicative of skin separate from non-skin based textures. Sensor 240 may gather independent data about an object or may process the images captured by image capture device 202 and image capture device 204.

Each of image capture device 202, image capture device 204, and sensor 240 transmit captured images and data to one or more computing systems enabled to initially receive and buffer the captured images and data. In the example, image capture device 202 transmits captured images to image capture server 308, image capture device 204 transmits captured images to image capture server 310, and sensor 240 transmits captured data to sensor server 312. Image capture server 308, image capture server 310, and sensor server 312 may be implemented within one or more server systems.

Each of image capture server 308, image capture server 310, and sensor server 312 streams the buffered images and data from image capture device 202, image capture device 204, and sensor device 240 to one or more processors. In the example, image capture server 308 streams images to a video processor 316, image capture server 310 streams images to a video processor 318, and sensor server 312 streams the sensed data to sensor processor 319. It is important to note that video processor 316, video processor 318, and sensor processor 319 may be implemented within one or more processors in one or more computer systems.

In one example, image capture server 308 and image capture server 310 each stream images to video processor 316 and video processor 318, respectively, where the images are streamed in frames. Each frame may include, but is not limited to, a camera identifier (ID) of the image capture device, a frame number, a time stamp and a pixel count.

Video processor 316, video processor 318, and sensor processor 319 are programmed to detect and track objects within image frames. In particular, because video processor 316, video processor 318, and sensor processor 319 receive streams of complex data and process the data to identify three-dimensional objects, including objects representing monitored users and supervising users, and characteristics of the three-dimensional objects, video processor 316, video processor 318, and sensor processor 319 may implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. For example, SPEs may be designed to more efficiently handle processing video streams to identify and map the points of moving objects within a stream of frames. In addition, video processor 316, video processor 318, and sensor processor 319 may implement other types of processor architecture that enables efficient processing of video images to identify, in three-dimensions, moving and stationary objects within video images from which types of user gestures can be identified.

In the example, video processor 316, video processor 318, and sensor processor 319 each create and stream the properties, including positions, color, size, shape, and orientation, of the detected objects to a geometry processor 320. In one example, each processed frame streamed to geometry processor 320 may include, but is not limited to, a camera ID, a frame number, a time stamp, and combinations of two or more of X axis coordinates (x_loc), Y axis coordinates (y_loc), and Z axis coordinates (z_loc). It is important to note that x_loc, y_loc, and z_loc may each include multiple sets of points and other data that identify all the properties of an object. If multiple objects are detected and tracked within a single frame, the X axis coordinates and Y axis coordinates for each object may be included in a single streamed object property record or in multiple separate streamed object property records. In addition, a streamed property frame, such as the frame from sensor processor 319 for a SONAR detected position, may include Z axis location coordinates, listed as z_loc, for example.

Geometry processor 320 receives the 2D streamed object properties from video processor 316 and video processor 318 and the other object data from sensor processor 319. Geometry processor 320 matches up the streamed 2D object properties and other data and constructs 3D object properties 110 from the streamed 2D object properties and other data. In particular, geometry processor 320 constructs 3D object properties 110 that include the depth of an object. In one example, each 3D object property record constructed by geometry processor 320 may include a time stamp, an object or user movement label, X axis coordinates (x_loc), Y axis coordinates (y_loc), and Z axis coordinates (z_loc), and additional information collected from sensors. For example, additional information collected from sensors may include a location identifier received from an RFID or GPS detected location coordinates.

At any of video processor 316, video processor 318, sensor processor 319, and geometry processor 320 property records may include at least one identifier to enable persistence in tracking the object. For example, the identifier may include a unique identifier for the object itself, an identifier of a class or type of object, including an object identified as user movement, and an identifier for a particular user.

In particular, by video processor 316, video processor 318, and sensor processor 319 identifying and classifying object properties, each of the processors may access behavior database 112 for accessing previously processed inputs and behavior mappings to more accurately identify and classify 2D object properties to detect and match the streamed 2D object properties to an object. In addition, geometry processor 320 may more accurately construct 3D properties of objects based on the streamed 2D object properties, based on previously matched and constructed 3D properties of objects accessed from behavior database 112. Further, object database 122 may store the streamed 2D object properties and 3D object properties for future reference.

In addition, by video processor 316, video processor 318, and sensor processor 319 identifying and classifying object properties and by geometry processor constructing 3D object properties 110, each of the processors may identify detected objects, including user gestures. For example, video processor 316, video processors 318, sensor processor 319, and geometry processor 320 may access behavior database 112, which includes specifications for use in mapping facial expressions and other body movements, performing facial and other body movement recognition, and performing additional processing to identify an object representing a gesture. In addition, video processor 316, video processors 318, sensor processor 319, and geometry processor 320 may access behavior database 112, which includes specifications for different types of environments for use in identifying a particular environment in which a user is located based on detected objects and background. Further, in constructing 3D object properties 110, video processor 316, video processors 318, sensor processor 319, and geometry processor 320 may identify multiple detected objects in the environment and therefore identify multiple user gestures and gestures associated with items within an environment.

Figure 4:
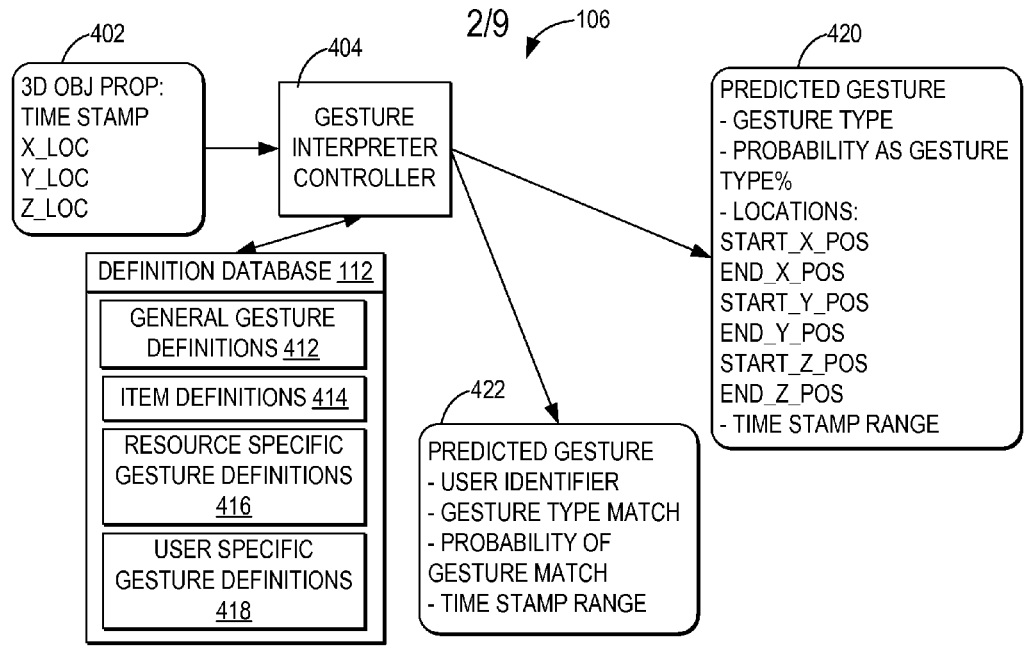
FIG. 4 is a block diagram depicting one embodiment of a gesture interpreter system.

Referring now to FIG. 4, a block diagram illustrates one embodiment of a gesture interpreter system. It is important to note that the multiple components depicted within gesture interpreter 106 may be incorporated within a single system or distributed via a network across multiple systems. In the example, a 3D properties record 402 includes "time stamp", "x_loc", "y_loc", and "z_loc" data elements. It will be understood that 3D properties record 402 may include additional or alternate data elements as determined by geometry processor 320 of FIG. 3. For example, 3D properties record 402 may include additional information identifying a particular or relative location of a user within a sensor area and not just within the focus area, colors, and other data collected by image capture devices and sensors and processed within 3D object detector 104.

Gesture interpreter 106 includes a gesture interpreter controller 404, where gesture interpreter controller 404 may include one or more processors programmed to perform gesture interpretation. For example, gesture interpreter controller 404 may include a processor with the CellBE architecture, programmed to efficiently process 3D object properties data streams, predict the gestures of a particular user and predict the types of gestures. In addition, gesture interpreter controller 404 may include processors upon which software runs, where the software directs processing of 3D object properties streams, predicts the gestures of a particular user and predicts the types of gestures.

In processing 3D object properties streams, predicting objects related to or representing a gesture of a particular user, and predicting the types of gestures, gesture interpreter controller 404 maps 3D object properties to one or more gesture definitions with a percentage probability that the streamed 3D object properties represent the mapped gesture definitions and with a percentage probability that the predicted gesture is correctly predicted. In particular, gesture interpreter controller 404 accesses one or more gesture definitions for one or more gestures and determines whether the 3D object properties match one or more characteristics of one or more gestures as defined in one or more of the gesture definitions. Gesture definitions may include mapped 3D models of one or more types of gestures. In addition, gesture definitions may define the parameters of identifying characteristics of a gesture including, but not limited to, body part detected, type of movement, surface characteristics, shape, speed of movement, frequency, span of movement, depth of movement, temperature, and color.

In addition, in processing 3D object properties streams, gesture interpreter controller 404 maps 3D object properties to one or more item definitions related to predicting user gestures, where a user may make a gesture in association with a particular item. In addition, gesture definitions may include mapped 3D models for gestures associated with an item.

It is important to note that in interpreting 3D object properties streams, gesture interpreter controller 404 performs an aggregate analysis of all the tracked objects in one or more 3D object properties streams identified for a particular focus area by one or more gesture processing systems. In one example, gesture interpreter controller 404 aggregates the 3D object property streams for a particular focus area and particular sensor area. In another example, gesture interpreter controller 404 may receive multiple 3D object properties streams from areas overlapping a focus area and sensor area, analyze the 3D object properties streams for similarities, location indicators, and orientation indicators, and construct the 3D object properties streams into a 3D aggregate representation of an area.

In one embodiment, gesture interpreter controller 404 may map the aggregate of the tracked objects directly into a single gesture definition. In another embodiment, behavior interpreter controller 404 maps multiple aggregated tracked objects into multiple gesture definitions. Additionally, gesture interpreter controller 404 may aggregate the tracked objects representative of gestures by multiple users within an environment.

In particular, in predicting types of gestures by a user for output to a resource control system, the gesture and item definitions within definition database 112 are specified to enable gesture interpreter controller 404 to focus on and distinguish gestures on a user by user basis, to distinguish types of gestures and the locations mapping to each type of gesture, to distinguish gestures in combination with an item, and to distinguish gestures indicative of authenticating a user identity. In the example, definition database 112 includes general gesture definitions 412, item definitions 414, resource specific definitions 416, and user specific gesture definitions 418. It will be understood that definition database 112 may include additional or alternate types of gesture definitions and may also include specific categories of item definitions. In addition, it is important to note that each of the groupings of definitions illustrated in the example may reside in a single database or may be accessed from multiple database and data storage systems via a network. Further, it is important to note that each of the groupings of definitions within definitions database 112 residing at a particular system may be adjusted or updated responsive to changes in authentication standards, new learned gestures, and other factors.

In one example, as illustrated, gesture interpreter controller 404 receives streams of 3D object property records, such as 3D object property record 402 and maps object property records to one or more applicable gesture definitions in definition database 112 and generates predicted gesture record 420. In particular, predicted gesture record 420 includes at least one gesture type, a probability that the gesture type is correctly predicted, mapped locations of the gesture, and the time frame range. Based on predicted gesture record 420, a resource control system may compare the gesture type and percentage probability to a required gesture type and minimum percentage probability to authenticate a user. In another example, based on predicted gesture record 420, a resource control system may compare the mapped locations of the gesture type over the time frame range to a previously recorded gesture definition specific for the user and determine whether the mapped locations match the gesture definition to authenticate a user.

To facilitate gesture interpreter controller 404 generating the data elements in predicted gesture record 420, general gesture definitions 412 may include gesture definitions for common types of gestures and factors for distinguishing between different degrees of common gestures, to provide gesture interpreter controller 404 with for gesture definitions for efficiently mapping 3D object properties into particular types of body movement and predicting common types of gestures. In addition, to facilitate gesture interpreter controller 404 generating the data elements in predicted gesture record 420, resource specific gesture definitions 416 may include gesture definitions for types of gestures requested by a particular resource control system. For example, if a resource control system matches facial expression gestures with facial expression keys for a user, then resource specific gesture definitions 416 may include the gesture definitions for particular types of facial expressions. Further, to facilitate gesture interpreter controller 404 generating the data elements in predicted gesture record 420, user specific gesture definitions 418 may include gesture definitions for distinguishing between gestures by different users and for distinguishing gestures of a particular user or group of users based on the visual characteristics of a particular user or group of users.

In another example, as illustrated gesture interpreter controller 404 receives streams of 3D object property records, maps 3D object property records to one or more applicable gesture definitions in definition database 112 specified for identifying a particular user, calculates a probability that the received 3D objected properties for a gesture match the gesture definition for the particular user, and generates predicted gesture record 422. In particular, predicted gesture record 422 includes a predicted user identifier, a gesture type matched, a probability that the gesture type is correctly predicted and matched, and the time frame range. Based on predicted gesture record 420, a resource control system may determine whether the type of gesture matched and the percentage probability of the match meet requirements for accepting the predicted user identifier. Alternatively, predicted gesture record 422 may include an identifier other than a user identifier.

To facilitate gesture interpreter controller 404 generating the data elements in predicted gesture record 422, general gesture definitions 412 may include gesture definitions for common types of gestures and factors for distinguishing between different degrees of common gestures, to provide gesture interpreter controller 404 with for gesture definitions for initially efficiently mapping 3D object properties into particular types of body movement and predicting common types of gestures. In addition, to facilitate gesture interpreter controller 404 generating the data elements in predicted gesture record 422, resource specific gesture definitions 416 may include gesture definitions for the specific gesture type matches requested by a particular resource control system and definitions specifying particular types of matching points for particular types of gestures. Further, to facilitate gesture interpreter controller 404 generating the data elements in predicted gesture record 422, user specific gesture definitions 418 may include gesture definitions for one or more types of gestures, where each gesture definition is specified for a particular user.

Within the available definitions within definition database 112, gesture definitions may include specifications classified by a level of experience of a user. For example, gesture definitions may distinguish between users with less experience providing gestures to access a resource and users with more experience providing gestures to access a resource.

Further, within the available gesture definitions within definition database 112, a gesture definition may be associated with a particular area of movement or a particular depth of movement within a 3D focus area. In particular, the three-dimensional focus area in which movement is detected may be divided into three-dimensional portions, where movements made in each of the portions may be interpreted under different selections of gesture definitions. For example, one three-dimensional portion of a focus area may be considered an "active region" where movement detected within the area is compared with a selection of gesture definitions associated with that particular active region, such as a region within a particular distance of a security point. In another example, the three-dimensional focus area may be divided into portions relative to the user's body, such that a particular gesture performed to the right of the user's head is distinguished from the same particular gesture performed to the left of the user's stomach region.

Moreover, within the available gesture definitions within definition database 112, gesture definitions may vary based on the speed and timing of a particular movement within a particular area of movement or depth of movement. For example, in a gesture definition, the speed at which a user changes the number of fingers held up affects the gesture type associated with the changing fingers.

In addition, within the available definitions within definition database 112, gesture definitions may map gestures representative of a sign language alphabet or words. In one example, a performance instruction may specify a password including one or more letters or words, where a user is required to sign the letters or words in a particular sign language alphabet.

It is important to note that each of predicted gesture record 420 and predicted gesture record 422 may include additional information acquired from sensors, such as RFID data, GPS coordinates, skin surface characteristics, and other sensed data, may be associated with a particular gesture record.

In transmitting predicted gesture records 420 and 422 to one or more resource control systems, gesture interpreter controller 404 may filter out particular types of predicted gesture records. In addition, in transmitting predicted gesture records 420 and 422 to one or more resource control system, gesture interpreter 404 may require a particular authentication of the resource control system or implementation of a particular security protocol to ensure privacy of the data elements included in predicted gesture records With reference now to FIG. 5, a block diagram depicts one embodiment of a computing system in which the present invention may be implemented. The controllers and systems of the present invention may be executed in a variety of systems, including a variety of computing systems, such as computer system 500, communicatively connected to a network, such as network 502.

Computer system 500 includes a bus 522 or other communication device for communicating information within computer system 500, and at least one processing device such as processor 512, coupled to bus 522 for processing information. Bus 522 preferably includes low-latency and higher latency paths that are connected by bridges and adapters and controlled within computer system 500 by multiple bus controllers. When implemented as a server, computer system 500 may include multiple processors designed to improve network servicing power. Where multiple processors share bus 522, an additional controller (not depicted) for managing bus access and locks may be implemented.

Processor 512 may be a general-purpose processor such as IBM's PowerPC™ processor that, during normal operation, processes data under the control of an operating system 560, application software 570, middleware (not depicted), and other code accessible from a dynamic storage device such as random access memory (RAM) 514, a static storage device such as Read Only Memory (ROM) 516, a data storage device, such as mass storage device 518, or other data storage medium. In one example, processor 512 may further implement the CellBE architecture to more efficiently process complex streams of data in 3D. It will be understood that processor 512 may implement other types of processor architectures. In addition, it is important to note that processor 512 may represent multiple processor chips connected locally or through a network and enabled to efficiently distribute processing tasks.

In one embodiment, the operations performed by processor 512 may control 3D image stream capture, prediction of gestures by a user from the captured 3D image stream, and resource control based on the predicted user gestures depicted in the operations of flowcharts of FIG. 10-13 and other operations described herein. Operations performed by processor 512 may be requested by operating system 560, application software 570, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 500 cause computer system 500 to perform a process according to the present invention. The terms "computer-readable medium" or "machine-readable medium" as used herein includes any medium that participates in providing instructions to processor 512 or other components of computer system 500 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 500 can read and which is suitable for storing instructions. In the present embodiment, an example of a non-volatile medium is mass storage device 518 which as depicted is an internal component of computer system 500, but will be understood to also be provided by an external device. Volatile media include dynamic memory such as RAM 514. Transmission media include coaxial cables, copper wire or fiber optics, including the wires that comprise bus 522. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 540 to requesting computer system 500 by way of data signals embodied in a carrier wave or other propagation medium via network 502 to a network link 534 (e.g. a modem or network connection) to a communications interface 532 coupled to bus 522. In one example, where processor 512 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 532 provides a two-way data communications coupling to network link 534 that may be connected, for example, to a local area network (LAN), wide area network (WAN), or directly to an Internet Service Provider (ISP). In particular, network link 534 may provide wired and/or wireless network communications to one or more networks, such as network 502. Further, although not depicted, communication interface 532 may include software, such as device drivers, hardware, such as adapters, and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Network link 534 and network 502 both use electrical, electromagnetic, or optical signals that carry digital data streams. The signals through the various networks and the signals on network link 534 and through communication interface 532, which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, a body scanning system, a keyboard, a mouse, or other input peripheral device, communicatively enabled on bus 522 via I/O interface 526 controlling inputs. In addition, for example, an output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Figure 5:
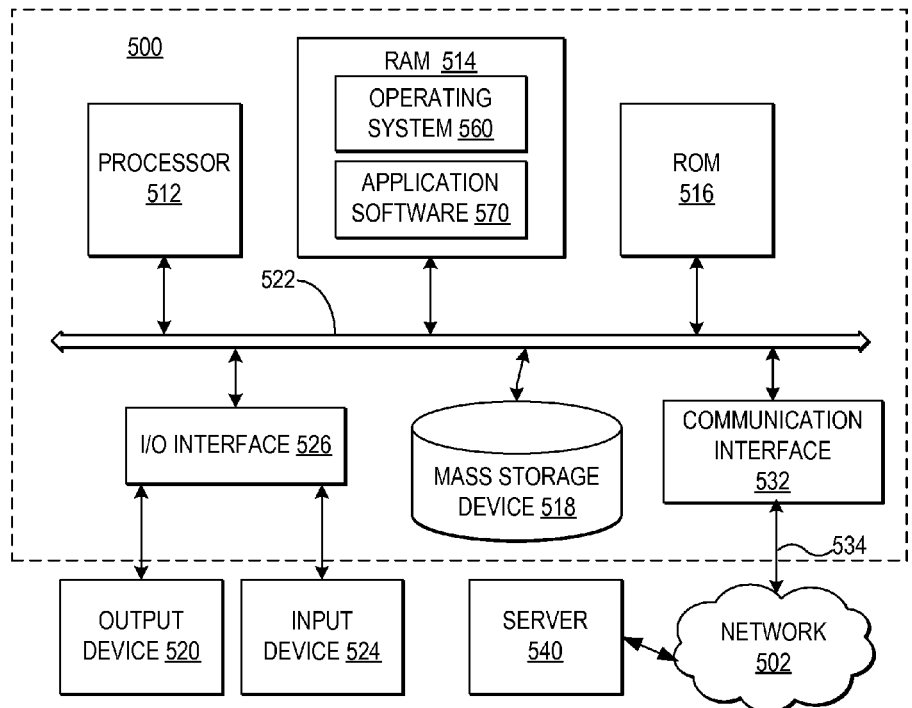
FIG. 5 is a block diagram illustrating one embodiment of a computing system in which the present invention may be implemented.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
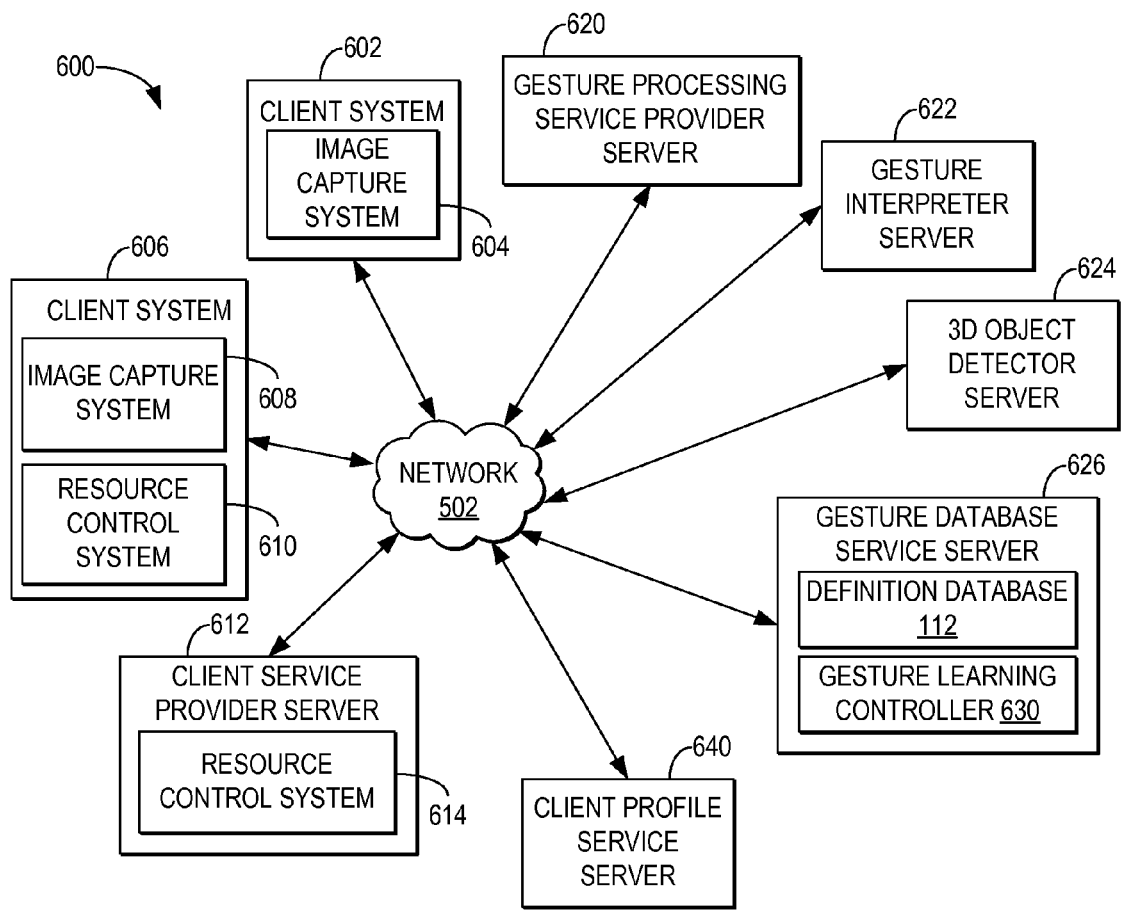
FIG. 6 is a block diagram depicting one example of a distributed network environment in which a gesture-enabled resource control method, system, and program product may be implemented.

Referring now to FIG. 6, a block diagram depicts one example of a distributed network environment in which a gesture-enabled resource control method, system, and program product may be implemented. It is important to note that distributed network environment 600 is illustrative of one type of network environment in which the gesture-enabled resource control method, system, and program product may be implemented, however, the gesture-enabled resource control method, system, and program product may be implemented in other network environments. In addition, it is important to note that the distribution of systems within distributed network environment 600 is illustrative of a distribution of systems; however, other distributions of systems within a network environment may be implemented. Further, it is important to note that, in the example, the systems depicted are representative of the types of systems and services that may be accessed or request access in implementing a gesture processing system and a gesture-enabled resource control system. It will be understood that other types of systems and services and other groupings of systems and services in a network environment may implement the gesture processing system and gesture-enabled resource control system.

As illustrated, multiple systems within distributed network environment 600 may be communicatively connected via network 502, which is the medium used to provide communications links between various devices and computer communicatively connected. Network 502 may include permanent connections such as wire or fiber optics cables and temporary connections made through telephone connections and wireless transmission connections, for example. Network 502 may represent both packet-switching based and telephony based networks, local area and wide area networks, public and private networks. It will be understood that FIG. 6 is representative of one example of a distributed communication network for supporting a gesture processing system and gesture-enabled resource control system; however other network configurations and network components may be implemented.

The network environment depicted in FIG. 6 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, distributed network environment 600 includes a client system 602 with an image capture system 604 and a client system 606 with an image capture system 608. In one example, image capture systems 604 and 608 are stereoscopic image devices implementing one or more image capture devices, such as image capture devices 202 and 204, and may include one or more sensors, such as sensor 240. Image capture systems 604 and 608 capture images and other data and stream the images and other data to other systems via network 502 for processing. In addition, image capture systems 604 and 608 may include video processors for tracking object properties, such as video processor 316 and video processor 318, described with reference to FIG. 3 and a geometry processor for generating streams of 3D object properties, such as geometry processor 320, described with reference to FIG. 3.

In one example, each of client system 602 and client system 606 may stream captured image frames to one or more object detection services. In one example, an gesture processing service provider server 620 provides a service that includes both an object detector service, such as 3D object detector 104, for processing streamed images and other data and a gesture interpreter service, such as gesture interpreter 106, for predicting types user gestures, predicting a probability that the captured images represent the predicted type of gesture, and controlling output of the predicted gesture records to one or more resource control systems accessible via network 502.

As to gesture processing service provider server 620, different entities may implement a gesture processing service and different entities may access the gesture processing service. In one example, a user logged into one of client system 602 or client system 606 may subscribe to the gesture processing service. In another example, a resource control system may request gesture processing of user gestures that can be captured by image capture system 604 or image capture system 608. Further, an image capture system or a particular resource control system requesting gesture processing may automatically stream captured images and data to the gesture processing service.

In another example, each of client system 602 and client system 606 may stream captured frames to a 3D object detector server 624. 3D object detector server 624 receives captured images and other data from image capture systems, such as image capture system 604 or image capture system 608, and processes the images and other data to generate 3D object properties of detected gesture, for output to a gesture interpreter system, such as gesture interpreter server 622 or gesture processing service provider server 620. In additional or alternate embodiments, an object detector service may be implemented within one or more other systems, with one or more other services performed within those systems. In particular, in additional or alternate embodiments, an object detector service may be implemented within a client system at which the images and other data are captured.

It is important to note that any of the client and server systems described, and in particular gesture processing service provider server 620, gesture interpreter server 622 or 3D object detector server 624, may be distributed across one or more systems. In particular, each of the client and server systems depicted may be distributed across systems with 3D image processing power, including processors with the CellBE architecture programmed to perform efficient 3D data processing. In one example, an entity, such as a business or service provider, may implement separate server systems for object detection and gesture interpretation, wherein multiple gesture interpreter modules are implemented with each gesture interpreter server processing different types of 3D object properties.

Gesture processing service provider server 620, gesture interpreter server 622, and 3D object detector server 624 may locally store a definition database, such as definition database 112, of raw images, 3D gesture properties, gesture definitions, and item definitions. In addition, gesture processing service provider server 620, gesture interpreter server 622 and 3D object detector server 624 may access a gesture database service server 626 that facilitates definition database 112.

In addition, gesture database service server 626 includes a gesture learning controller 630. Gesture learning controller 630 prompts users to provide samples of particular types of gestures and prompts users to indicate whether a predicted type of gesture matches the user's actual gesture. In addition, gesture learning controller 630 gathers other information that enables gesture learning controller 630 to learn and maintain gesture definitions in definition database 112 that when accessed by object detector services and gesture interpreter services, increases the accuracy of generation of 3D object properties and accuracy of prediction of types of gestures from 3D object properties by these services.

Further, behavior processing service provider server 620, behavior interpreter server 622, 3D object detector server 624, or behavior database service server 626 may access additional context information for a user operator, including gesture definitions specified for a particular user, from a client profile service server 640. In one example, client profile service server 640 facilitates capturing and storing gesture definitions for particular types of gestures, accessible to multiple services, such as gesture processing service provider server 620, gesture interpreter server 622, resource control system 610, and resource control system 614, such that a user need not provide a separate gesture sample to each of the separate servers.

Gesture processing service provider server 620 and gesture interpreter server 622 stream predicted gesture records, such as predicted gesture records 420 and 422, to gesture-enabled resource control systems via network 502. In the example embodiment, client system 606 includes a gesture-enabled resource control system 610, enabling client system 606 to determine whether received predicted gesture records for a user and determine whether to authenticate a user identification, allow a user access to a resource, or otherwise control a resource based on the predicted gesture records.

In addition, in the example embodiment, client service provider server 612 includes a gesture-enabled operator monitoring system 614. In one example, resource control system 614 represents a gesture-enabled resource control service provided to subscribers of client service provider server 612. In particular, resource control system 614 may represent a gesture-enabled resource control service for controlling user access to a resource controlled by client service provider server 612, such as an electronic lock or an online back account. In another example, resource control system 614 may represent a gesture-enabled resource control service for confirming a user association with an identifier or account designated in a resource read by client service provider server 612, such as a passport or credit card.

It is important to note that user may be informed, through resource control system 610, resource control system 614, or other systems, of a performance instruction specifying the gesture or sequence of gestures the user is required to perform to receive access to a resource. In another example, a user may be unaware that types of gestures predicted from the user's movement are accessed by a resource control system for facilitating resource control.

In particular, as to a user receiving a performance instruction, it is important to note that each of resource control system 610 and 614 may sends a performance instruction to a user in concurrently with a user requesting access to a resource or prior to the user requesting access to a resource. Any of gesture processing service provider server 620, gesture interpreter server 622, resource control system 610, or resource control system 614 that perform gesture type matching may receive the performance instruction and determine whether predicted gesture types match the gesture types in the performance instruction and whether the gestures match the sequence of gestures in the performance instruction. Alternatively, a performance instruction may be included in a resource specific gesture definition for a particular resource control system.

It is important to note that gesture learning controller 630 may collect predicted gesture records for a user from multiple gesture interpreter servers and services, analyze the types of gestures for patterns of movement, compare the user's gesture patterns with gesture patterns of other users, and generate recommended performance instructions for use by a resource control system tailored to the particular user. In addition, gesture learning controller 630 may generate, from the collected user gesture patterns and gesture patterns of other users, recommended gesture definitions for use by a resource control system when a user is unaware that the user's gestures are being monitored.

Figure 7:
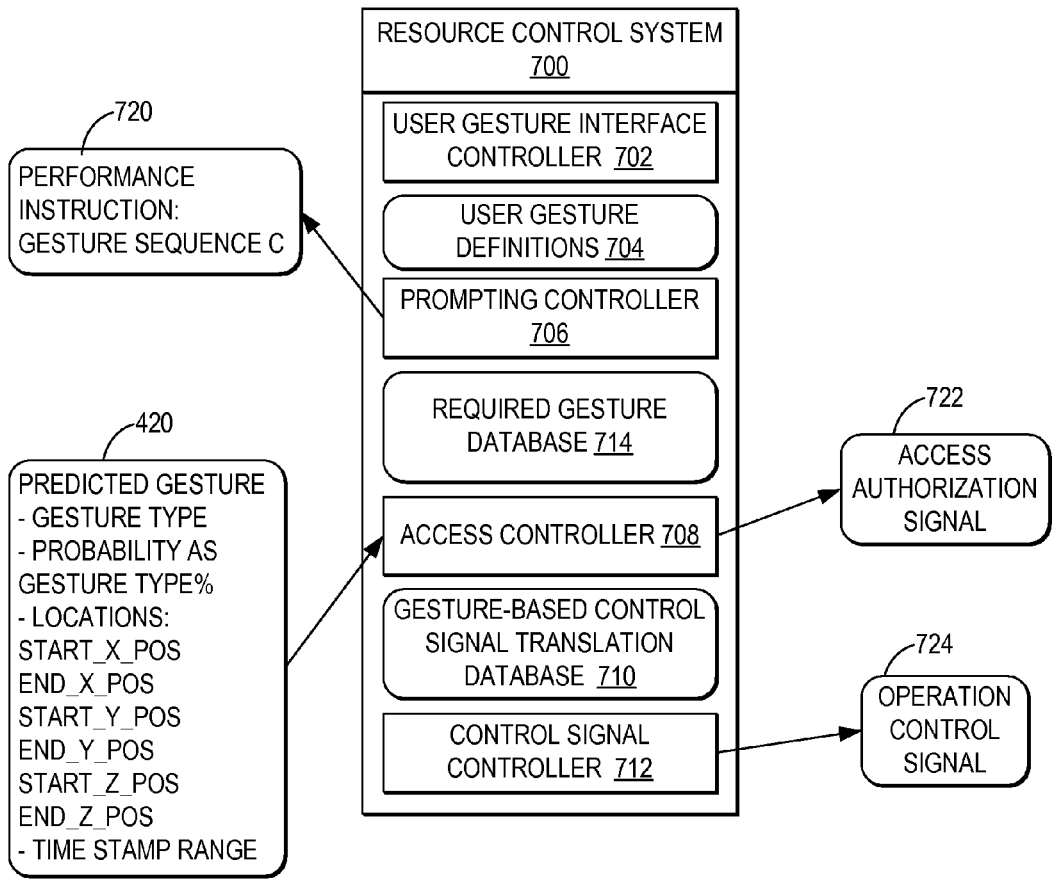
FIG. 7 is a block diagram illustrating one example of an implementation of a gesture interpreter system for predicting gestures from which a gesture-enabled resource control system determines whether the predicted gestures match gesture samples for a user.

With reference now to FIG. 7, a block diagram illustrates one example of an implementation of a gesture interpreter system for predicting gestures from which a gesture-enabled resource control system determines whether the predicted gestures match gesture samples for a user. It will be understood that resource control system 700 may include additional or alternate components for performing resource control.

Resource control system 700 includes a user interface controller 702. In one example, user interface controller 702 controls an interface for prompting a user to provide a sample of a gesture type or sequence of gestures. User gesture interface controller 702 prompts a gesture processing system to capture a 3D image stream of the user performing the sample gestures and to provide predicted gesture records of the sample gestures for storage by user gesture interface controller 702 as gesture definitions for the user in user gesture definitions 704. In another example, resource control system 700 may access user gesture definitions 704 from client profile service server 640 or other system accessible via network 502 that stores user specific gesture definitions.

In addition, resource control system 700 includes a prompting controller 706. Prompting controller 706 prompts a user with a performance instruction of a gesture or sequence of gestures that a user is to perform. Performance instructions may be specified for a particular user, group of users, time of day, or other criteria. In addition, a performance instruction may require that a wear a particular item, such as a ring on a particular finger, a uniform, or other detectable item. In particular, prompting controller 706 may determine performance instructions based on a selected one or more required gestures from required gesture database 714.

In the example, a performance instruction 720 specifies a gesture performance of a "sequence C". In the example, an indicator of "sequence C" may be output to a user through multiple types of interfaces accessible to the user including, but not limited to, an audio interface, a display interface, and a tactile detectable interface. The user, having previously been informed of the required gestures associated with "sequence C" may select to perform the requested gestures.

In addition or alternatively, prompting controller 706 may control output of a performance instruction specifying a sequence of specific types of gestures or may specify a particular gesture and specify a time-based pattern that the series of gestures should follow or may specify a time-based pattern, where the user may select a particular type of gesture to perform in a series of gestures matching the time-based pattern. For example, the pattern may include a discernable pattern of audible tones with an instruction to recreate the audible pattern in through thumb tapping.

Access controller 708 receives predicted gesture records, such as predicted gesture record 420, including predicted gesture types, percentage probability that the gesture type is correctly predicted, the locations of the predicted gesture type mapping, and the time stamp range. Access controller 708 determines whether the predicted gesture record enables access controller 708 to generate an access authorization signal 722. In one example, access authorization signal 722 is sent to a controller within resource control system 700 to authorize resource access. In another example, access authorization signal 722 is sent to another system to authorize resource access or other resource control.

In one example, access controller 708 determines whether the predicted type of gesture in one record matches a required gesture type or sequence of gestures selected from required gesture database 714 and generates authorization signal 722 indicating whether there is a match. In one example, required gesture database 714 includes required gestures and background items for access based on the particular user, a particular day of the week, a particular time of day, or other factors. In addition, required gesture database 714 may include a gesture type generator that randomly selects from among gesture types and required background items to be worn by the user.

In another example, access controller 708 determines whether the predicted type of gesture in one record matches a required gesture type in a performance instruction and generates access authorization signal 722 indicating whether there is a match. In another example, access controller 708 collects predicted gesture records and determines whether the predicted types of gestures match the required gesture type in a performance instruction and whether the time stamp ranges of the predicted gesture records indicate the series of gestures followed the required time-based pattern. In addition, in matching types of gestures in predicted gesture records, access controller 708 may determine whether the predicted probability that the gesture type is correctly predicted reaches a minimum threshold specified in general or for particular types of gestures.

In another example, access controller 708 determines whether the predicted type of gesture and the mapped location for that gesture in one record matches to the gesture definition for the type of gesture in user gesture definitions 704. For example, access controller 708 determines whether a predicted gesture of a nod matches a sample gesture definition from user gesture definitions 704 mapping how a user nods. In determining whether the predicted type of gesture and mapped locations for that gesture match the sample gesture definition for a user, access controller determines a percentage probability in the matching. Based on matching the gesture mapped locations to a user gesture definition with a minimum threshold of certainty in the matching, access controller 708 generates access authorization signal 722.

For example, for a user gesture to authorize access controller 708 to send an access control signal 722 to an electronic lock controller, in one embodiment, resource control system 700 may require that a user place a hand under the handle and tap a particular number of times with a finger to receive access. In another example, access controller 708 may require that the way the user places the hand under the handle and taps match previously sampled gesture definitions for the user holding the hand under the handle and tapping that uniquely identify the user.

It is important to note that access controller 708 may require a user to perform different gestures at different access points and may adjust the minimum probability of correct prediction or matching for different access points. For example, for a user to enter a door, such as a vehicle door, the user is required to perform the gestures as previously described. For the user to start the car, however, the user may be required to perform types of gestures or gesture sequences that are less likely to be mimicked by an unauthorized user.

In addition, access controller 708 may require a user to perform different gestures in correlation with a particular background item. For example, access controller 708 may require a user to perform a particular gesture and wear a particular color of nail polish, wear a ring or other jewelry on a particular finger, or wear a particular uniform or clothing color. The required background item may change based on the day of the week, the time of day, or other factor. In one example, a user is securely provided with a schedule of background items to wear, which are stored in required gesture database 714, and performance instruction 720 only specifies the gesture for the user to perform in correlation with the background item when the user requests access. In another example, once access controller 708 detects a user enter a personal identification code or gesture such that the user is identified, access controller 708 may then prompt the user with performance instruction 720 specifying the background item for the user to put on based on the required background item at that time specified in required gesture database 714.

In addition, it is important to note that resource control system 700 may include or access an existing or additional identification or authentication system or augment an existing system with gesture-based authentication performed by access controller 708. For example, access controller 708 may require that a user enter a user identifier and key in a password, in addition to performing required gestures. By combining multiple types of authentication or identification systems with gesture-based authentication that a user is allowed access to a resource, additional protection is provided.

In another example, resource control system 700 may interface with or represent a key fob, which is a separate device or software with built-in authentication mechanisms where a user first enters a pin number or gesture to identify that the user is the owner of the key fob device and then the key fob device provides the user with instructions for logging onto a network, to provide the owner of the device with password control as long as the owner is in possession of the key fob. In one example, in response to a user gesture or background item worn by a user matching a required gesture or background item in required gesture database 714, access controller 708 generates the instructions, such as a key number, for the user to log on to a network. In another example, in response to a user entering a pin, access controller 708 generates the instructions from required gesture database 714, such as a required gesture, sequence of gestures, or a required background item for the user to wear, that a user must follow for access controller 708 to generate access authorization signal 722.

In addition, resource control system may include a control signal controller 712. Control signal controller 712 detects whether predicted gesture record 420 includes a predicted gesture type that triggers an operational control signal for a resource controller 726 or another system. In particular, control signal controller 712 translates the predicted type of gesture in predicted gesture record 420 into operation control signal 724 based on an applicable translation rule in gesture-based control signal translation database 710. In one example, control signal controller 712 translates a predicted gesture of a user waving into operation control signal 724 for triggering a security dispatch system or other help system. In another example, control signal controller 712 translates a predicted gesture of a user closing a hand into operation control signal 724 for triggering an automated financial system to start a withdrawal process and translates a predicted gesture of a user opening a hand into operation control signal 724 for triggering the automated financial system to start a deposit process.

Further, it is important to note that if access controller 708 does not generate access authorization signal 722 granting an access request, in one example, the user may be prompted to provide additional identification, performance additional gestures, or provide biometric voice or fingerprint samples. In addition, if access controller 708 does not generate access authorization signal 722 granting an access request, access controller 708 may prompt control signal controller 712 to generate an operation control signal for triggering control of a security system or a help system.

Figure 8:
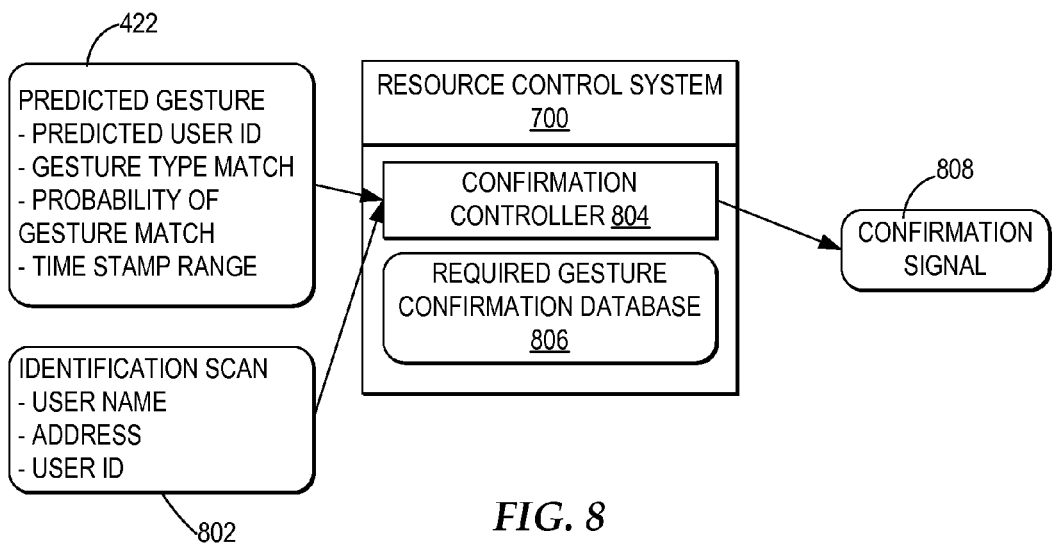
FIG. 8 is a block diagram depicting one example of a resource control system for controlling confirmation of a user based on a predicted gesture record and identification presented by the user.

Referring now to FIG. 8, a block diagram illustrates one example of a resource control system for controlling confirmation of a user based on a predicted gesture record and identification presented by the user. In the example, resource control system 700 includes a confirmation controller 804. Confirmation controller 804 receives a record of a scan of identification information presented by a user. In the example, identification scan record 802 includes a user name, address, and unique user identifier (ID). Identification scan record 802 may be based, for example, on a scan of a passport, a driver's license' or other personal identification card, document, or device. In another example, scan record 802 may be based on a scan of a credit card where the user ID is the user's credit card number.

In some systems, for a user to confirm that the user presenting identification is the same as the user identified in the identification or authorized to use the identification, confirmation controller 804 may collect additional information from or about the user presenting the identification. In the example, confirmation controller 804 collects predicted gesture record 422 which identifies a predicted user ID, a gesture type matched, the probability that the gesture type is correctly matched and a time stamp range. Confirmation controller 804 determines whether the data entries in predicted gesture record 422 or a stream of predicted gesture records match requirements in required gesture confirmation database 806 for confirming the gesturing user is identified by or authorized to user identification indicated in identification scan record 802. If confirmation controller determines that the data entries in predicted gesture record 422 or a stream of predicted gesture records match the requirements, then confirmation controller 804 may issue a confirmation signal 808 to a system requesting confirmation or to other systems.

In one example, required gesture confirmation database 806 specifies minimum probability percentages that the predicted gesture matches a sample gesture definition for the identified user. In another example, required gesture confirmation database 806 specifies required gesture types, requires series of gestures, and required time-based patterns. Minimum probability percentages, required gesture types, required gesture series, required time-based patterns, and other criteria within required gesture confirmation database 806 may be further specified based on the type of gesture, the type of identification presented, and other factors.

In addition, required gesture confirmation database 806 may include translations for matching different formats of user ID and for determining authorized users associated with identification. For example, the identification presented by a user may include a user ID of a passport number or credit card number, however, predicted gesture record 422 may include a user ID of a user name or user gesture processing subscriber number. Required gesture confirmation database 806 may access records for matching the user ID in identification scan record 802 with the predicted user ID in predicted gesture record 422. In addition, the identification presented by a user may be authorized for use by multiple users, such as a business credit card. Required gesture confirmation database 806 may access records of authorized user IDs for a particular business credit card or other identification authorized for use by multiple people.

Figure 9:
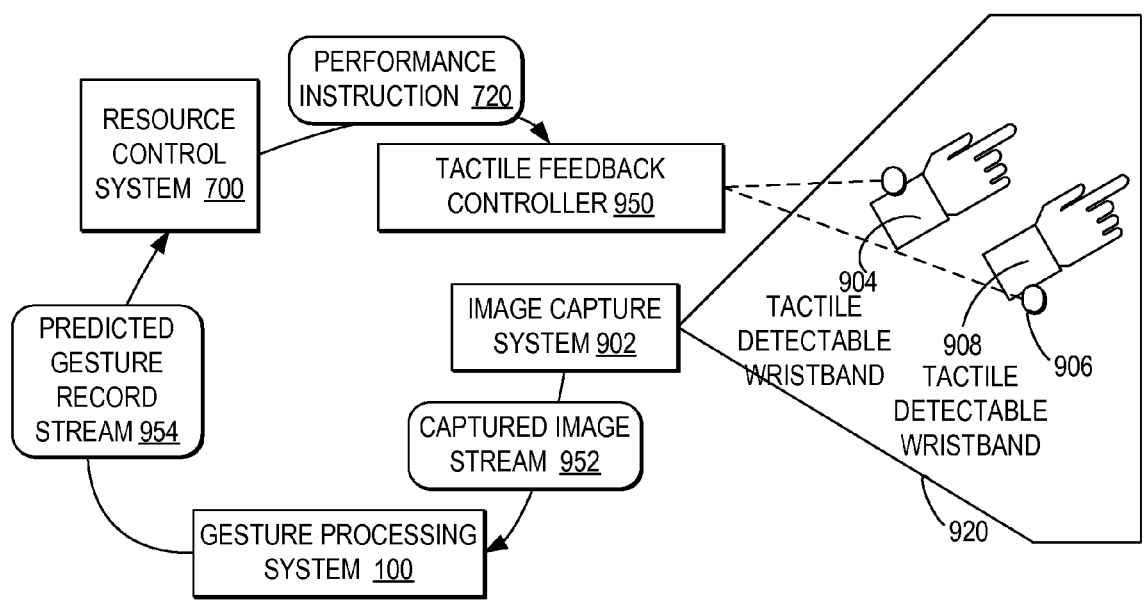
FIG. 9 is an illustrative diagram illustrating one example of a resource control system controlling access based on user gesturing matching performance instructions output to the user via tactile feedback.

With reference now to FIG. 9, a block diagram illustrates one example of a resource control system controlling access based on user gesturing matching performance instructions output to the user via tactile feedback. In the example, resource control system 700 controls output of performance instruction 720 to tactile feedback controller 950. In particular, performance instruction 720 specifies instructions for output of tactile feedback by tactile feedback controller 950 to one or more tactile feedback devices, wherein a user is enabled to feel the tactile feedback via one or more tactile feedback devices, for example through changes in the pressure of a pulse made by the device, changes in a surface of a device, or vibration of the device. Tactile feedback signal may direct the strength, duration, frequency, position, pattern and other characteristics of the tactile feedback. In addition, the tactile feedback signal detected by a user may communicate one or more of a type of gesture, a series of gestures and a time-based pattern of gesturing to a user.

In one example, tactile feedback controller 950 controls output of tactile feedback signals to one or more tactile detectable wristbands 904 and 908 worn by a user. In the example, wristband 904 includes a wireless transmitter 902 and wristband 908 includes a wireless transmitter 906. Each of wireless transmitter 902 and wireless transmitter 906 communicate via a wireless network transmission to tactile feedback controller 950 to receive tactile feedback signals specifying tactile outputs at wristbands 904 and 908.

In one example, the user detects tactile feedback through tactile detectable wristbands 904 and 908 specifying a time-based pattern for a gesture series. For example, a user can hear a person knock on a door with a particular pattern of knocking and then mimic the knock pattern. Similarly, the user can detect a tactile feedback pattern and mimic the pattern in a series of gestures timed to mimic the time-based pattern.

As the user mimics the tactile feedback pattern through hand gestures, image capture devices 902 captures a 3D image stream of the user hand movement within an area 920 and transfers captured image stream 952 to gesture processing system 100. Gesture processing system 110 processes captured image stream 952, generates predicted gesture records for each gesture, and transmits the predicted gesture record stream 954 to resource control system 700. Resource control system 700 determines whether to provide resource access or confirmation from predicted gesture record 420.

In one example, tactile feedback controller 950 may be implemented within a portable computer system and image capture system 902 is attached to the portable computer system. A user wears wristbands 904 and 908 while operating the portable computer system and receives any performance instructions through tactile feedback in wristbands 904 and 908. By sending performance instructions to a user at a tactile feedback device, only the user detects the instructions for a gesture type, series of gestures, and time-based patterns to be performed. Resource control system 700 may represent an operating system of the portable computer system that periodically prompts a user via tactile feedback to perform gestures to maintain a login authentication. In another example, resource control system 700 may represent a security tool for the portable computer system that detects each time a user is required to enter identification at a website or other application and, in addition to the identification required by the website, the security tool sends a performance instruction via tactile feedback to the user and determines whether a captured and predicted gesture by the user matched a required series of gestures over a time-based pattern or a gesture definition.

In another example, in lieu of a user wearing wristbands, a user may carry a tactile feedback device, such as a portable telephone device, where tactile feedback controller 950 and image capture system 902 are integrated within the portable telephone device. Tactile feedback controller 950 may translate performance instruction 720 into a vibration of the portable telephone device or an audible output to an earpiece worn by the user and connected to the portable telephone device.

In addition, it is important to note that as previously described with reference to FIG. 6, one or more of resource control system 700, tactile feedback controller 950, image capture system 902, and gesture processing system 100 may be implemented in a single system or distributed across multiple systems connected by network 502. For example, tactile feedback controller 950 and image capture system 902 may be integrated into a portable computing device that communicatively connects via network 502 to gesture processing system 100 and resource control system 700.

Figures 10, 11:
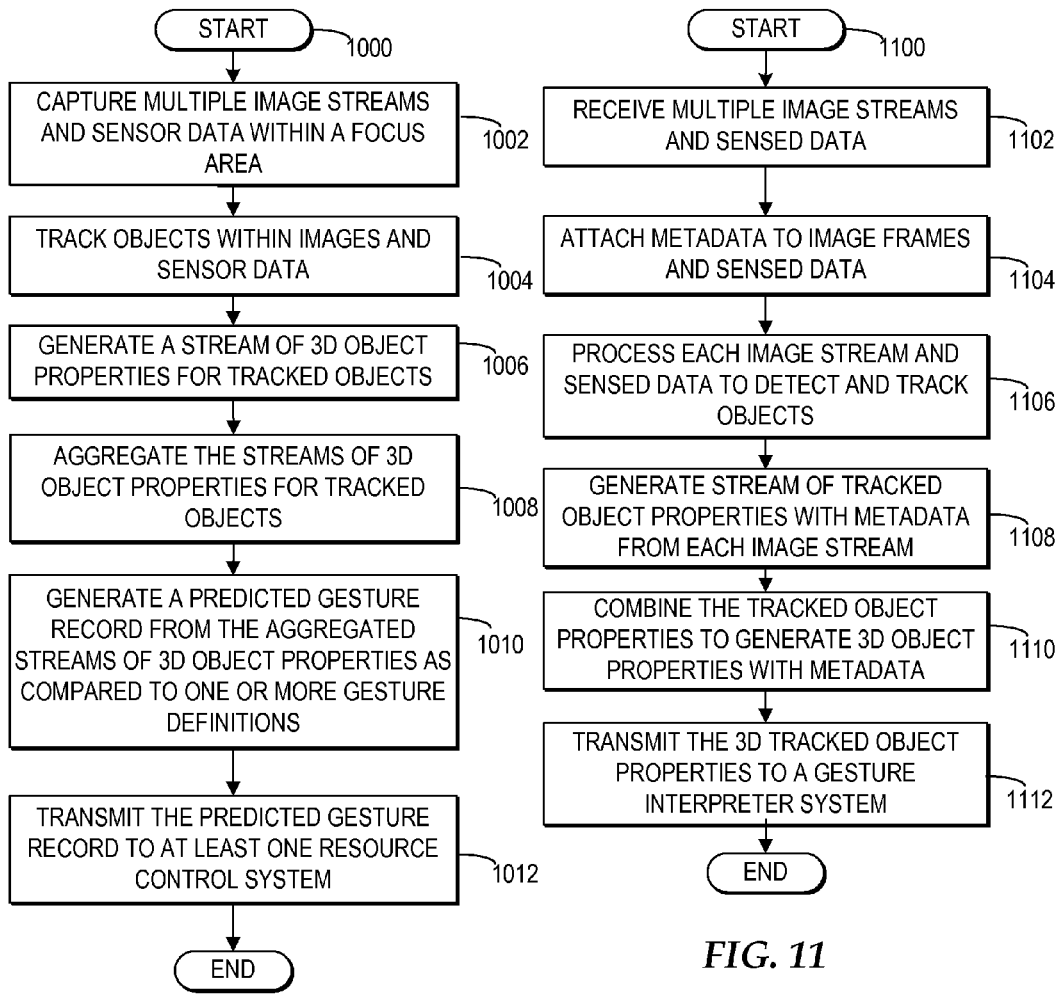
FIG. 10 is a high level logic flowchart depicting a process and program for a gesture processing system to predict types of gestures with a percentage probability.
FIG. 11 is a high level logic flowchart illustrating a process and program for a 3D object detector of a gesture processing system enabling gesture detection by tracking objects within image streams and other sensed data and generating 3D object properties for the tracked objects representative of gestures.

Referring now to FIG. 10, a high level logic flowchart depicts a process and program for a gesture processing system to predict types of gestures with a percentage probability. In the example, the process starts at block 1000, and thereafter proceeds to block 1002. Block 1002 depicts capturing, via at least one image device, multiple image streams and via sensors, sensor data, within a focus area. Next, block 1004 illustrates tracking objects within the images and sensor data. Thereafter, block 1006 depicts generating a stream of 3D object properties for tracked objects. Thereafter, block 1008 depicts aggregating the 3D object properties for each of the tracked objects. In particular, the aggregated 3D object properties represent one or more objects tracked in association with gestures of a user. Next, block 1010 illustrates predicting a gesture record from the aggregated stream of 3D object properties as compared to one or more gesture definitions that match the aggregated stream of 3D object properties with a percentage of probability. Thereafter, block 1012 depicts transmitting each predicted gesture record to at least one resource control system, and the process ends.

With reference now to FIG. 11, a high level logic flowchart depicts a process and program for a 3D object detector of a gesture processing system enabling gesture detection by tracking objects within image streams and other sensed data and generating 3D object properties for the tracked objects representative of gestures. As illustrated, the process starts at block 1100 and thereafter proceeds to block 1102. Block 1102 depicts an object detector system receiving multiple image streams, via at least one image capture device, and sensed data, via one or more sensors. Next, block 1104 illustrates the object detector system attaching metadata to the image frames and sensed data, and the process passes to block 1106. In one example, metadata includes data such as, but not limited to, a camera identifier, frame number, timestamp, and pixel count.

Block 1106 depicts the object detector system processing each image stream and sensed data to detect and track objects, wherein objects may include physical objects and user movement indicative of a gesture. Next, block 1108 illustrates generating streams of tracked object properties with metadata from each image stream. Thereafter, block 1110 depicts combining the tracked object properties to generate 3D object properties with metadata. Next, block 1112 illustrates transmitting the 3D tracked object properties to a gesture interpreter system, and the process ends.

Figure 12:
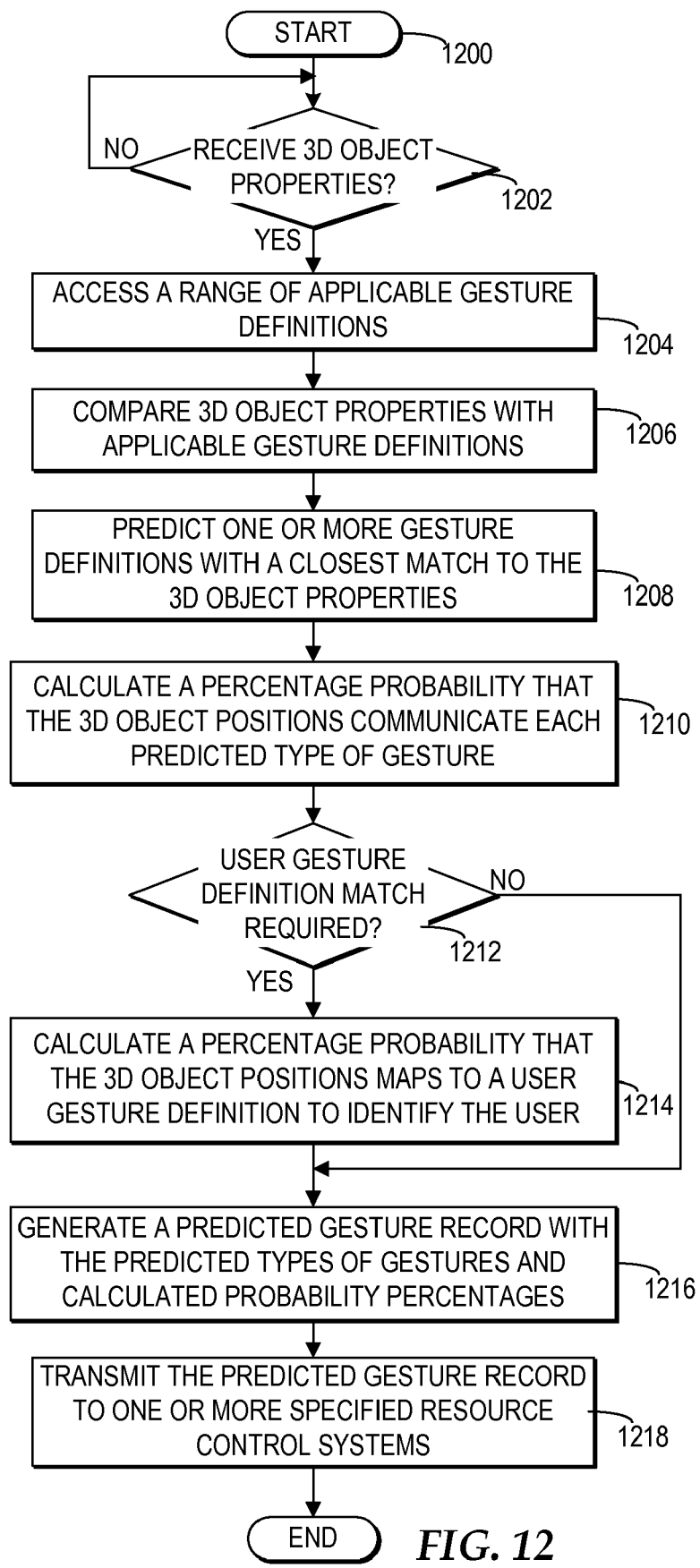
FIG. 12 is a high level logic flowchart depicting a process and program for a gesture interpreter system of a gesture processing system enabling gesture prediction from tracked 3D object properties.

Referring now to FIG. 12, a high level logic flowchart depicts a process and program for a gesture interpreter system of a gesture processing system enabling gesture prediction from tracked 3D object properties. In the example, the process starts at block 1200 and thereafter proceeds to block 1202. Block 1202 depicts a determination whether the gesture interpreter system receives 3D object properties. When the gesture interpreter system receives 3D object properties, then the process passes to block 1204. Block 1204 depicts accessing a range of applicable gesture definitions, and the process passes to block 1206.

Block 1206 illustrates the gesture interpreter system comparing the filtered 3D object properties for tracked objects with the applicable gesture definitions. Next, block 1208 depicts the gesture interpreter system predicting at least one gesture definition with a closest match to one or more sets of filtered 3D object properties. Thereafter, block 1210 illustrates calculating a percentage probability that the 3D object properties are the actual gesture in the predicted matching gesture definitions. Next, block 1212 depicts a determination whether the gesture interpreter system is required to match the user gesture definition. If the gesture interpreter system is required to match the user gesture definition, then the process passes to block 1214. Block 1214 depicts calculating a percentage probability that the 3D object positions maps to a user specified gesture definition to identify the user, and the process passes to block 1216.

Returning to block 1212, if the gesture interpreter system is not required to match the user gesture definition, then the process passes to block 1216. Block 1216 depicts generating a predicted gesture record with the predicted types of gestures and calculated probability percentages. Next, block 1218 depicts transmitting the predicted gesture record to one or more specified resource control systems, and the process ends.

Figure 13:
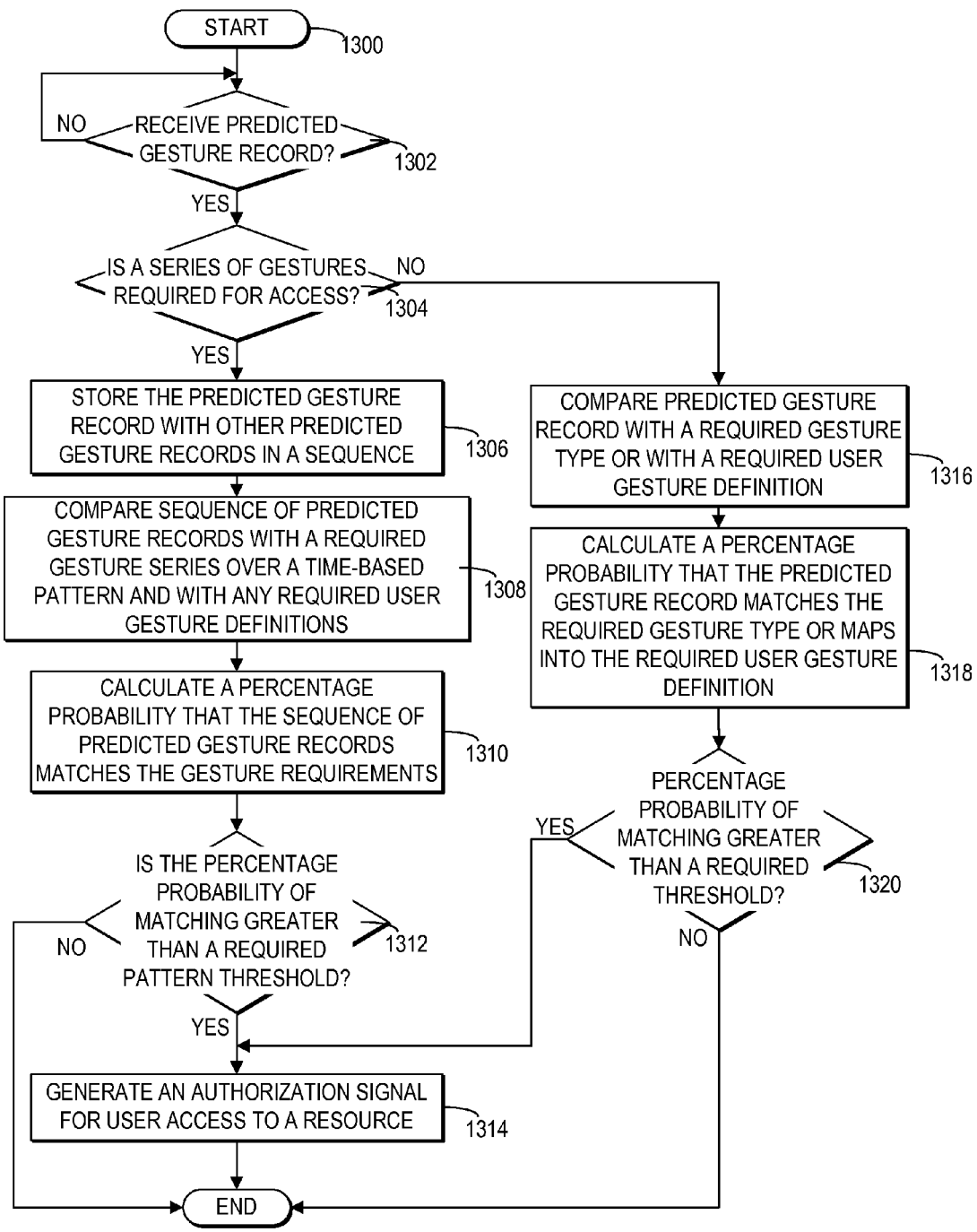
FIG. 13 is a high level logic flowchart illustrating a process and program for a resource control system analyzing a predicted gesture record to determine whether to authorize user access to a resource.

With reference now to FIG. 13, a high level logic flowchart depicts a process and program for a resource control system analyzing a predicted gesture record to determine whether to authorize user access to a resource. As illustrated, the process starts at block 1300 and thereafter proceeds to block 1302. Block 1302 depicts a determination whether a gesture-enabled resource control system receives a predicted behavior record. When the resource control system receives a predicted gesture record, then the process passes to block 1304. Block 1304 illustrates a determination whether the resource control system requires a series of gestures for access. If the resource control system requires a series of gestures, then the process passes to block 1306.

Block 1306 depicts storing the predicted gesture record with other predicted gesture records in a sequence. Although not depicted, the resource control system may store a sequence of predicted gesture records prior to triggering the step at block 1308 or the gesture processing system may transmit a predicted gesture record specifying a predicted sequence of gestures. Block 1308 illustrates comparing the sequence of predicted gesture records with a required gesture series with a time-based pattern and any required user gesture definitions. Thereafter, block 1310 depicts calculating a percentage probability that the sequence of predicted gesture records matches the gesture requirements for a user to access a resource. Next, block 1312 illustrates a determination whether the percentage probability of matching is greater than a required pattern threshold. If the percentage probability of matching is greater than a required pattern threshold then the process passes to block 1314, which depicts generating an authorization signal for the user to access a resource, and the process ends. Otherwise, at block 1312, if the percentage probability of matching is not greater than a required pattern threshold, the process ends.

Returning to block 1304, if the resource control system does not require a series of gestures, then the process passes to block 1316. Block 1316 illustrates comparing the predicted gesture record with a required gesture type or with a required user gesture definition. Next, block 1318 depicts calculating a percentage probability that the predicted gesture record matches the required gesture type or maps into the required user gesture definition. Thereafter, block 1320 illustrates a determination whether the probability of matching is greater than a required threshold. If the probability of matching is greater than a required threshold, then the process passes to block 1314. Otherwise, if the probability of matching is not greater than a required threshold, the process ends.

In addition, with regard to FIG. 13, if the probability of matching is not greater than a pattern or other type of threshold, the user may be prompted to provide additional identification or a control signal controller of the resource control system may prompt security personnel or a security control system.

Figure 14:
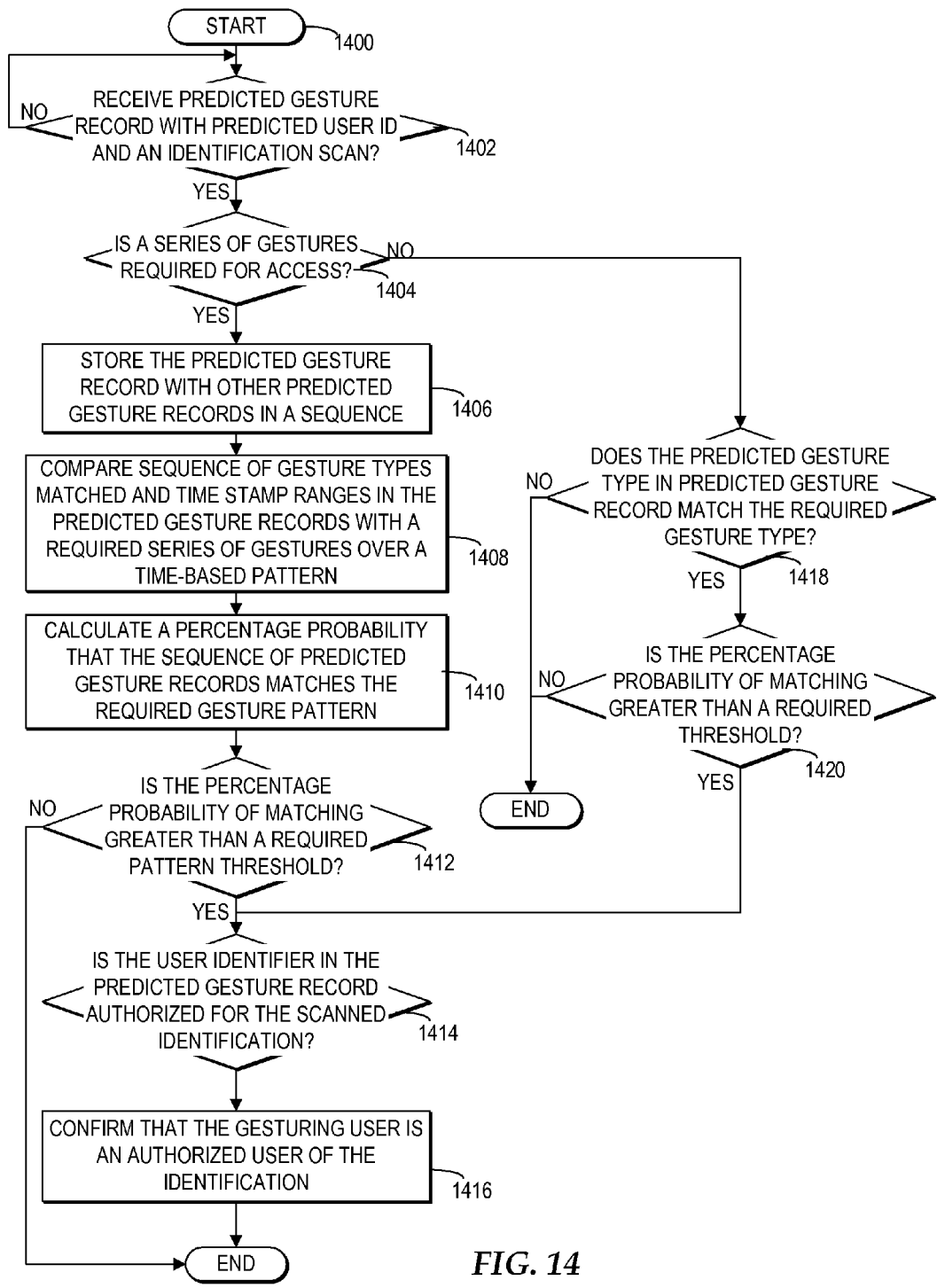
FIG. 14 is a high level logic flowchart depicting a process and program for a resource control system analyzing a predicted gesture record to determine whether the user identified by the predicted gesture record is an authorized user of identification presented by the user.

With reference now to FIG. 14, a high level logic flowchart depicts a process and program for a resource control system analyzing a predicted gesture record to determine whether the user identified by the predicted gesture record is an authorized user of identification presented by the user. As illustrated, the process starts at block 1400 and thereafter proceeds to block 1402. Block 1402 depicts a determination whether a gesture-enabled resource control system receives an identification scan and a predicted behavior record with a predicted user ID based on a gesture match. When the resource control system receives a predicted gesture record and identification scan, then the process passes to block 1404. Block 1404 illustrates a determination whether the resource control system requires a series of gestures for access. If the resource control system requires a series of gestures, then the process passes to block 1406.

Block 1406 depicts storing the predicted gesture record with other predicted gesture records in a sequence. Although not depicted, the resource control system may store a sequence of predicted gesture records prior to triggering the step at block 1408 or the gesture processing system may transmit a predicted gesture record specifying a predicted sequence of gestures. Block 1408 illustrates comparing the sequence of matched gesture types and time stamp ranges from the predicted gesture records with a required series of gesture types with a time-based pattern. Thereafter, block 1410 depicts calculating a percentage probability that the sequence of predicted gesture records matches the gesture requirements. Next, block 1412 illustrates a determination whether the percentage probability of matching is greater than a required pattern threshold. If the percentage probability of matching is greater than a required pattern threshold then the process passes to block 1414. Otherwise, at block 1412, if the percentage probability of matching is not greater than a required pattern threshold, the process ends.

Block 1414 depicts a determination whether the user identifier in the predicted gesture record or records, and now authenticated by matching gestures, is authorized for the scanned identification. If the user identification is authorized for the scanned identification, then the process passes to block 1416. Block 1416 illustrates the resource control system confirming that the gesturing user is an authorized user of the identification, and the process ends.

Returning to block 1404, if the resource control system does not require a series of gestures, then the process passes to block 1418. Block 1418 illustrates a determination whether the predicted gesture type match in the predicted gesture record matches the required gesture type. If the predicted gesture type match in the predicted gesture record does not match the required match type, then the process ends. If the predicted gesture type match in the predicted gesture record does match the required match type, then the process passes to block 1420. Block 1420 depicts a determination whether the percentage probability calculated in the predicted gesture record matches the required threshold. Thereafter, block 1420 illustrates a determination whether the probability of matching is greater than a required threshold. If the probability of matching is greater than a required threshold, then the process passes to block 1414. Otherwise, if the probability of matching is not greater than a required threshold, the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for controlling access to a resource, comprising:
   sending, by a resource control system for controlling electronic access by a user to a resource, to the user a communication comprising a performance instruction specifying a plurality of instruction sequences each specified by separate a name of a separate instruction sequence from among the plurality of instruction sequences, at least one required gesture to be made by the user to access the resource, and at least required one background item to be worn by the user when making the sequence of gestures, prior to the user requesting to access the resource;
   responsive to the user requesting to access the resource, accessing the performance instructions previously submitted to the user and selecting one instruction sequence of the plurality of instruction sequences based on a time of day;
   prompting the user with the name of the selected instruction sequence;
   capturing a three-dimensional movement of a user and an image of the three-dimensional movement, wherein the three-dimensional movement and image is determined using at least one image capture device aimed at the user;
   predicting at least one gesture definition of at least one gesture type from among a plurality of gesture definitions matching at least one defined movement within the captured three-dimensional movement;
   predicting at least one background item definition of at least one background item type from among a plurality of background item definitions matching at least one item worn by the user within the image;
   and
   only allowing user access to the resource if the predicted at least one gesture type matches with the at least one required gesture for the selected instruction sequence and if the predicted at least one background item matches the required background item for the selected instruction sequence.

2. The method according to claim 1, wherein capturing a three-dimensional movement of the user further comprises capturing the three-dimensional movement using a stereoscopic image device to identify and track a particular three-dimensional movement of the user.

3. The method according to claim 1, wherein predicting at least one gesture definition of at least one gesture type from among a plurality of gesture definitions matching at least one defined movement within the captured three-dimensional movement further comprises calculating a percentage probability that the at least one defined movement represents the at least one gesture type defined in the at least one gesture definition.

4. The method according to claim 1, wherein predicting at least one gesture definition of at least one gesture type from among a plurality of gesture definitions matching at least one defined movement within the captured three-dimensional movement further comprises calculating a percentage probability that the at least one defined movement maps to the at least one gesture type defined in the at least one gesture definition, wherein the at least one gesture definition specifies a particular gesture definition of the at least one gesture type by the user.

5. The method according to claim 1, wherein predicting at least one gesture definition of at least one gesture type from among a plurality of gesture definitions matching at least one defined movement within the captured three-dimensional movement further comprises identifying at least one of body movement of the user comprising at least one of a head movement, a facial expression, an eye movement, a muscle contraction, and a change in skin surface characteristics of the user within the at least one defined movement matching at least one of the plurality of gesture definitions.

6. The method according to claim 1, further comprising:
   capturing a three-dimensional movement of a user, wherein the three-dimensional movement is determined using at least one image capture device aimed at the user;

predicting a sequence of at least one gesture type matching a sequence of a plurality of defined movements within the captured three-dimensional movement;

requesting access to the resource based on the sequence of predicted matching gesture types each specified according to a separate time range when captured; and only allowing user access to the resource by matching the predicted matching gesture types at the separate time ranges with a required series of least one required gesture type with the separate time ranges matching a time-based pattern.

7. The method according to claim 1, further comprising:

generating an operation control signal for at least one computer system based the operation control signal matching the at least one gesture type.

8. The method of claim 1, further comprising:

selecting a time based pattern;

prompting the user with the name of the selected instruction sequence and an instruction to enter the gesture following the time based pattern;

outputting the time based pattern via a tactile detectable device detectable by the user;

comparing the captured three-dimensional movement with the time based pattern to detect whether the user gestured to mimic the time based pattern; and only allowing user access to the resource if the predicted at least one gesture type matches the at least one required gesture for the selected instruction sequence and the user enters the at least one gesture type to mimic the time based pattern.

9. A system for controlling access to a resource, comprising:

a resource control system for controlling electronic access by a user to a resource;

the resource control system for sending a communication to the user comprising a performance instruction specifying a plurality of instruction sequences each specified by separate a name of a separate instruction sequence from among the plurality of instruction sequences, at least one required gesture to be made by the user to access the resource, and at least required one background item to be worn by the user when making the sequence of gestures, prior to the user requesting to access the resource;

the resource control system, responsive to the user requesting to access the resource, for accessing the performance instructions previously submitted to the user and selecting one instruction sequence of the plurality of instruction sequences based on a time of day;

the resource control system for prompting the user with the name of the selected instruction sequence;

a gesture processing system communicatively connected to the resource control system via a network;

the gesture processing system for capturing a three-dimensional movement of a user and an image of the three-dimensional movement, wherein the three-dimensional movement and image is determined using at least one image capture device aimed at the user;

the gesture processing system for predicting at least one gesture definition of at least one gesture type from among a plurality of gesture definitions matching at least one defined movement within the captured three-dimensional movement;

the gesture processing system for predicting at least one background item definition of at least one background item type from among a plurality of background item definitions matching at least one item worn by the user within the image;

the resource control system for only allowing user access to the resource if the predicted at least one gesture type matches with the at least one required gesture for the selected instruction sequence and if the predicted at least one background item matches the required background item for the selected instruction sequence.

10. The system according to claim 9, further comprising the gesture processing system for capturing the three-dimensional movement using a stereoscopic image device to identify and track a particular three-dimensional movement of the user.

11. The system according to claim 9, further comprising the gesture processing system for calculating a percentage probability that the at least one defined movement represents the at least one gesture type defined in the at least one gesture definition.

12. The system according to claim 9, further comprising the gesture processing system for calculating a percentage probability that the at least one defined movement maps to the at least one gesture type defined in the at least one gesture definition, wherein the at least one gesture definition specifies a particular gesture definition of the at least one gesture type by the user.

13. The system according to claim 9, further comprising the gesture processing system for identifying at least one of body movement of the user comprising at least one of a head movement, a facial expression, an eye movement, a muscle contraction, and a change in skin surface characteristics of the user within the at least one defined movement matching at least one of the plurality of gesture definitions.

14. The system according to claim 9, further comprising:

the gesture processing system for capturing a three-dimensional movement of a user, wherein the three-dimensional movement is determined using at least one image capture device aimed at the user;

the gesture processing system for predicting a sequence of at least one gesture type matching a sequence of a plurality of defined movements within the captured three-dimensional movement;

the resource control system for requesting access to the resource based on the sequence of predicted matching gesture types each specified according to a separate time range when captured; and the resource control system for only allowing user access to the resource by matching the predicted matching gesture types at the separate time ranges with a required series of least one required gesture type with the separate time ranges matching a time-based pattern.

15. The system of claim 9, further comprising:

the resource control system for selecting a time based pattern;

the resource control system for prompting the user with the name of the selected instruction sequence and an instruction to enter the gesture following the time based pattern;

the resource control system for outputting the time based pattern via a tactile detectable device detectable by the user;

the gesture processing system for comparing the captured three-dimensional movement with the time based pattern to detect whether the user gestured to mimic the time based pattern; and the resource control system for only allowing user access to the resource if the predicted at least one gesture type matches the at least one required gesture for the selected instruction sequence and the user enters the at least one gesture type to mimic the time based pattern.

16. A program product comprising a storage-type computer-usable medium including a computer-readable program for controlling access to a resource, wherein the computer-readable program when executed on a computer cause the computer to:

send, by a resource control system for controlling electronic access by a user to a resource, a communication to the user comprising a performance instruction specifying a plurality of instruction sequences each specified by separate a name of a separate instruction sequence from among the plurality of instruction sequences, at least one required gesture to be made by the user to access the resource, and at least required one background item to be worn by the user when making the sequence of gestures, prior to the user requesting to access the resource;

responsive to the user requesting to access the resource, access the performance instructions previously submitted to the user and selecting one instruction sequence of the plurality of instruction sequences based on a time of day;

prompt the user with the name of the selected instruction sequence;

capture a three-dimensional movement of a user and an image of the three-dimensional movement, wherein the three-dimensional movement and image is determined using at least one image capture device aimed at the user;

predict at least one gesture definition of at least one gesture type from among a plurality of gesture definitions matching at least one defined movement within the captured three-dimensional movement;

predict at least one background item definition of at least one background item type from among a plurality of back round item definitions matching at least one item worn by the user within the image;

and only allow user access to the resource if the predicted at least one gesture type matches with the at least one required gesture for the selected instruction sequence and if the predicted at least one background item matches the required background item for the selected instruction sequence.

17. The program product of claim 16, wherein said computer-readable program is transmitted over a network.

18. The program product of claim 16, wherein the computer-readable program when executed on the computer further causes the computer to capture the three-dimensional movement using a stereoscopic image device to identify and track a particular three-dimensional movement of the user.

19. The program product of claim 16, wherein the computer-readable program when executed on the computer further causes the computer to calculate a percentage probability that the at least one defined movement maps to the at least one gesture type defined in the at least one gesture definition, wherein the at least one gesture definition specifies a particular gesture definition of the at least one gesture type by the user.

20. The program product of claim 16, wherein the computer-readable program when executed on the computer further causes the computer to:

select a time based pattern;

prompt the user with the name of the selected instruction sequence and an instruction to enter the gesture following the time based pattern;

output the time based pattern via a tactile detectable device detectable by the user;

compare the captured three-dimensional movement with the time based pattern to detect whether the user gestured to mimic the time based pattern; and only allow user access to the resource if the predicted at least one gesture type matches the at least one required gesture for the selected instruction sequence and the user enters the at least one gesture type to mimic the time based pattern.

* * * * *